United States Patent
Heiberger et al.

(10) Patent No.: US 6,856,062 B2
(45) Date of Patent: Feb. 15, 2005

(54) HOMOPOLAR MACHINE WITH SHAFT AXIAL THRUST COMPENSATION FOR REDUCED THRUST BEARING WEAR AND NOISE

(75) Inventors: Michael Heiberger, Belmont, MA (US); Michael Robert Reed, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/431,337

(22) Filed: May 6, 2003

(65) Prior Publication Data

US 2004/0145265 A1 Jul. 29, 2004

Related U.S. Application Data

(60) Continuation-in-part of application No. 09/934,803, filed on Aug. 22, 2001, now Pat. No. 6,628,033, which is a division of application No. 09/559,240, filed on Apr. 26, 2000, now Pat. No. 6,489,700.

(51) Int. Cl.[7] ............................................. H02K 31/00
(52) U.S. Cl. ...................... 310/178; 310/219; 310/231; 310/238
(58) Field of Search .......................... 310/12, 15, 178, 310/90.5, 90, 190, 191, 213, 219, 238–239, 231–232

(56) References Cited

U.S. PATENT DOCUMENTS

| | | | |
|---|---|---|---|
| 3,890,019 A | 6/1975 | Boden et al. | 308/10 |
| 3,944,865 A | 3/1976 | Jewitt | 310/178 |
| 3,976,339 A | 8/1976 | Sabnis | 308/10 |
| 4,110,648 A | 8/1978 | Stillwagon | 310/178 |
| 4,180,296 A | 12/1979 | Habermann | 308/10 |
| 4,185,216 A | 1/1980 | Mole et al. | 310/178 |
| 4,208,600 A | 6/1980 | Hatch | 310/178 |
| 4,241,271 A | 12/1980 | Johnson et al. | 310/219 |
| 4,271,369 A | 6/1981 | Stillwagon | 310/178 |
| 4,276,507 A | 6/1981 | Stillwagon | 302/48 |
| 4,399,381 A | 8/1983 | Chabrerie | 310/178 |
| 4,581,555 A | 4/1986 | Kuznetsov et al. | 310/178 |
| 4,602,179 A | 7/1986 | Kuznetsov et al. | 310/178 |
| 4,710,656 A | 12/1987 | Studer | 310/51 |
| 4,710,666 A | 12/1987 | Rindal et al. | 310/218 |
| 4,858,304 A | 8/1989 | Weldon et al. | 310/178 |
| 5,010,563 A | 4/1991 | Laurent et al. | 378/132 |
| 5,027,280 A | 6/1991 | Ando et al. | 364/474 |
| 5,032,748 A | 7/1991 | Sakuraba et al. | 310/52 |

(List continued on next page.)

FOREIGN PATENT DOCUMENTS

JP    10-136622    5/1998    ......... H02K/5/998

*Primary Examiner*—Burton Mullins
(74) *Attorney, Agent, or Firm*—Fitch, Even, Tabin & Flannery

(57) ABSTRACT

A homopolar machine produces an axial counter force on the rotating shaft to compensate for the load on the shaft's thrust bearing to reduce wear and noise and prolong bearing life. The counter force is produced through magnetic interaction between the shaft and the machine's field coils and is created by changing the current excitation of the field coils, which results in a magnetic flux asymmetry in an inner flux return coupled to the shaft. The homopolar machine may also have a configuration that uses current collectors that maintain substantially constant contact pressure in the presence of high magnetic fields to improve current collector performance. The current collectors are flexible and may be made from either electrically conductive fibers or stacked strips such that they bear up against the armature so that the pressure is maintained by the spring constant of the current collector material. The homopolar machine may also have a configuration where the brushes are oriented so that the current is aligned as much as is practical with the local magnetic field lines so as to reduce the lateral electromagnetic forces on the brushes.

33 Claims, 16 Drawing Sheets

U.S. PATENT DOCUMENTS

| | | |
|---|---|---|
| 5,216,308 A | 6/1993 | Meeks .................... 310/90.5 |
| 5,278,470 A | 1/1994 | Neag ...................... 310/178 |
| 5,349,256 A | 9/1994 | Holliday .................. 310/12 |
| 5,385,007 A | 1/1995 | Hartel et al. ............... 57/76 |
| 5,451,825 A | 9/1995 | Strohm .................... 310/178 |
| 5,481,149 A | 1/1996 | Kambe et al. ............. 310/178 |
| 5,514,924 A | 5/1996 | McMullen et al. ........ 310/90.5 |
| 5,517,072 A | 5/1996 | Hildebrandt ............... 310/228 |
| 5,530,309 A | 6/1996 | Weldon .................... 310/178 |
| 5,572,079 A | 11/1996 | Pinkerton ................. 310/90.5 |
| 5,587,618 A | 12/1996 | Hathaway ................. 310/178 |
| 5,729,066 A | 3/1998 | Soong et al. .............. 310/90.5 |
| 5,731,645 A | 3/1998 | Clifton et al. .............. 310/74 |
| 5,739,606 A | 4/1998 | Takahata et al. ........... 310/90.5 |
| 5,767,597 A | 6/1998 | Gondhalekar .............. 310/90.5 |
| 5,804,899 A | 9/1998 | Jamain et al. ............. 310/90.5 |
| 5,821,659 A | 10/1998 | Smith ...................... 310/178 |
| 5,834,867 A | 11/1998 | Kikuchi et al. ............. 310/51 |
| 6,245,440 B1 | 6/2001 | Kuhlmann-Wilsdorf et al. ....................... 428/611 |
| 6,489,700 B1 * | 12/2002 | Heiberger et al. .......... 310/178 |
| 6,628,033 B1 * | 9/2003 | Heiberger et al. .......... 310/178 |

* cited by examiner

HOMOPOLAR MACHINE WITH SHAFT AXIAL THRUST COMPENSATION FOR REDUCED THRUST BEARING WEAR AND NOISE

CROSS-REFERENCE TO RELATED APPLICATIONS

This application is a Continuation-in-Part (CIP) of U.S. application Ser. No. 09/934,803, filed Aug. 22, 2001 now U.S. Pat. No. 6,628,033, which is a Divisional of U.S. application Ser. No. 09/559,240, filed Apr. 26, 2000, now U.S. Pat. No. 6,489,700, the full contents of both applications are hereby incorporated herein by reference.

BACKGROUND OF THE INVENTION

The present invention relates to direct current machines, and more specifically to homopolar machines.

Homopolar machines are operated by direct current (DC) and are simple in design principle. They have been under development for consideration in ship propulsion applications because of their high efficiency, compact size, low weight, and reduced acoustic signature relative to all other motors.

As is well known in the art, a homopolar machine includes four major components: armature; stator; field coils; and flux return. The armature is connected to the machine's shaft and may also be referred to as the rotor. The armature typically includes a series of concentric, copper cylinders and is free to rotate in a direction at right angles to the magnetic field lines produced by the field coils. When a voltage is applied across the armature in the direction of the shaft, electric current flows parallel to the shaft. The current and magnetic field interaction (I×B) results in torque generation and rotation, thus producing a motor. In contrast, if the armature is driven externally for a generator application, the interaction of the armature rotating at right angles to the magnetic field lines generates a voltage and electric current.

In both the motor and generator scenarios, current flows along the armature and to the stationary stator via sliding electrical contacts referred to herein as current collectors. The current collectors may also be commonly referred to as brushes, and may take the form of many materials. Such materials include but are not limited to flexible fibrous copper, flexible copper strips, or as common to most DC motors, rigid material made from graphite or silver-graphite.

The field coils are typically circumferentially continuous in geometry and aligned on the same central axis with respect to each other. A homopolar machine always cuts (or crosses as it rotates) magnetic flux lines of a magnetic field in the same direction due to the interacting armature and shaft iron being aligned on the same axis. This means that any point on the rotor always sees the same magnetic field as it rotates and no difference in magnetic flux or multiple magnetic poles are encountered by conductive elements of the armature as it rotates. Hence the nomenclature "homopolar machine".

The flux return is typically comprised of a highly magnetically permeable material such as iron or steel. The flux return is designed primarily to limit the undesirable stray magnetic field that radiates from the machine, and therefore, it typically takes the form of a structural housing that surrounds the motor. In addition, the flux return may also be designed to help direct the magnetic field lines produced by the field coils into the armature interaction region to improve the machine's flux utilization.

Although conventional rotating machines are in wide use, most have inherent disadvantages associated with mechanical bearing wear. For example, large machines such as generators connected to turbines, as well as motors used for propulsion, use thrust bearings to react the induced axial mechanical forces on the shaft and to maintain a stable shaft axial position. The mechanical thrust that is induced on the shaft induces an axial thrust on the thrust bearing, which causes thrust bearing wear and noise. The mechanical thrust induced on the shaft may be from many sources. For example, in a generator application the induced thrust is caused by the axial pressure differential across a connected turbine, and in a propulsion motor application the induced thrust is caused by the thrust exerted by the connected propulsor. If a homopolar machine was used in these applications, it would be prone to this same type of problem. Ships, submarines and airplanes all experience thrust bearing forces within their propulsion systems. The induced axial mechanical forces are also referred to herein as thrust bearing loads.

As thrust bearing loads increase, wear and tear and associated noise increase at a rate on the order of pressure cubed (i.e., $p^3$ where p is pressure due to the thrust bearing load). This means that a reduction of pressure on the shaft by two fold translates into a reduction of associated wear by eight fold. Such a reduction of pressure on the shaft would result in a thrust bearing lifetime of eight times its original lifetime. Thus, there is a need for a method and/or apparatus that helps to reduce thrust bearing loads in homopolar machines.

A unique disadvantage of homopolar machines is that they tend to have lower reliability in comparison to standard DC motors. Specifically, homopolar machines use current collectors to transfer current between each rotating armature turn and each stationary stator turn. One limitation of the utility of homopolar machines is the heavy dependence on current collectors that are potentially unreliable, a large source of efficiency loss, and maintenance problems.

An important factor in a current collector's performance is its contact pressure with the armature. Performance is measured in terms of current collector wear and current carrying capability. Maintaining an ideal contact pressure is difficult because in a homopolar machine the current collectors must be in the magnetic field zone where the collectors are subject to bending and torque. Homopolar machines have been designed with mechanisms that help to maintain an ideal contact pressure, but these result in size, weight, and cost penalties, and introduce new sources of reliability problems. Thus, there is a need for a method and/or apparatus that helps to reduce the wear and tear of current collectors in homopolar machines.

SUMMARY OF THE INVENTION

The present invention advantageously addresses the needs above as well as other needs by providing an apparatus that includes a homopolar machine. The homopolar machine includes a shaft, an armature assembly coupled to the shaft, an outer flux return that encloses the armature assembly, an inner flux return coupled to the shaft, and means for producing a magnetic field asymmetry within the inner flux return that produces an axial force on the shaft.

Another aspect of the present invention provides a homopolar machine comprising a shaft; a plurality of armature assemblies, coupled to the shaft, that includes a plurality of armature conductor turns; a plurality of current collectors that provide a sliding electrical current interface with the plurality of armature conductor turns; and means for maintaining substantially constant contact pressure of the current collectors with the plurality of armature conductor turns in the presence of high magnetic fields produced by a plurality of superconducting field coils.

And another aspect of the present invention provides a homopolar machine comprising a shaft; an armature assembly, coupled to the shaft, that includes a plurality of armature conductor turns; and a plurality of stator-current collector arrays that encircle the armature assembly, each stator-current collector array including a plurality of current collectors that maintain substantially constant contact pressure with the armature conductor turns in the presence of a high magnetic field to provide a sliding electrical current interface with the armature conductor turns; wherein the plurality of stator-current collector arrays is oriented such that the high magnetic field is substantially parallel to a direction of current flow in a region where at least one of the plurality of stator-current collectors contacts one of the armature conductor turns to reduce induced magnetic forces that may deflect the current collector.

A subsequent aspect of the present invention provides a method of operating a homopolar machine, comprising the steps of rotating a plurality of armature assemblies that include a plurality of armature conductor turns; creating a magnetic field through the plurality of armature assemblies; providing a plurality of stator-current collector arrays that encircle the plurality of armature assemblies, each stator-current collector array including a plurality of current collectors which provide a sliding electrical current interface with the armature conductor turns; reducing induced magnetic forces that may deflect the current collectors by directing magnetic field lines substantially parallel to a direction of current flow in a region where at least one of the plurality of current collectors contact the armature conductor turns; and maintaining substantially constant contact pressure between the plurality of current collectors and the plurality of armature assemblies in the presence of the magnetic field.

An additional aspect of the present invention provides a method of operating a homopolar machine, comprising the steps of energizing superconducting field coils in the homopolar machine to create a magnetic field through a plurality of armature assemblies, each of the plurality of armature assemblies including a plurality of armature conductor turns; supplying current to a plurality of current collectors that provide a sliding electrical current interface with the plurality of armature conductor turns; and maintaining an orientation of the plurality of current collectors and the magnetic field so that magnetic field lines are directed substantially parallel to a direction of current flow in a region where at least one of the plurality of current collectors contact the armature conductor turns to reduce induced magnetic forces on the plurality of current collectors.

Another aspect of the present invention provides an apparatus that includes a homopolar machine, the homopolar machine comprising a shaft; an armature assembly coupled to the shaft; and a plurality of superconducting coils configured to produce a magnetic field asymmetry for generating an axial force on the shaft to compensate for an external axial force imposed on the shaft.

An additional aspect of the present invention provides A method of operating a homopolar machine, comprising rotating an armature assembly coupled to a shaft wherein the shaft rotates with the armature assembly; energizing a first field coil in the homopolar machine to a first excitation level to generate a first magnetic field through the armature assembly coupled to the shaft; and energizing a second field coil in the homopolar machine to a second excitation level to generate a second magnetic field through the armature assembly wherein the second excitation level is different than the first excitation level for producing a magnetic field asymmetry that generates an axial force on the shaft to compensate an external axial force imposed on the shaft.

BRIEF DESCRIPTION OF THE DRAWINGS

The above and other aspects featured and advantages of the present invention will be more apparent from the following more particular description thereof presented in conjunction with the following drawings herein.

Corresponding reference characters indicate corresponding components throughout several figures.

DETAILED DESCRIPTION OF A PREFERRED EMBODIMENT

The following description of the presently contemplated best mode of practicing the invention is not to be taken in a limiting sense, but is made merely for the purpose of describing the general principle of the invention. The scope of the invention should be determined with reference to the claims.

In accordance with the principles of the present invention, a homopolar machine is described that addresses the problems discussed above with respect to thrust bearing wear and current collector performance.

With respect to thrust bearing wear, a homopolar machine in accordance with the present invention, designed as either a motor or a generator, produces an axial counter force on the rotating shaft to compensate for the load on the shaft's thrust bearing to reduce wear and noise and prolong bearing life. The counter force relieves the thrust bearing load and is produced through magnetic interaction between the shaft and the machine's field coils. As will be discussed below, this is accomplished by positioning part of the machine's iron flux return on the shaft (herein referred to as the inner flux return), which magnetically couples with the magnetic field produced by the field coils. An axial force is produced on the shaft by adjusting the magnetic field produced by the field coils by adjusting the current flow through the field coils to different levels. This can be accomplished without affecting the machine's torque, as long as the ampere-turns change in one coil is maintained equal and opposite of the ampere-turns change in the other coil.

As mentioned above, a bearing's wear rate or "life" reduces exponentially with the load or force on the bearing, so even fractional reductions in bearing load can prolong a bearing's life significantly. An additional benefit of reduced pressure on the thrust bearing is also reduced acoustic noise, an important factor in applications that require quieter running machines, such as submarine propulsion systems.

With respect to current collector performance, a homopolar machine in accordance with another aspect of the present invention has a configuration that uses current collectors that maintain substantially constant contact pressure on the armature surface in the presence of high magnetic fields. This is because the magnetic field lines are oriented in substantially the same direction as the direction of current flow in the current collectors, so the I×B force that would disturb the contact pressure is reduced. As will be discussed below, the current collectors are flexible and may be made from either electrically conductive fibers or stacked strips such that they bear up against the armature so that the pressure is maintained by the spring constant of the current collector material.

Figure 1:
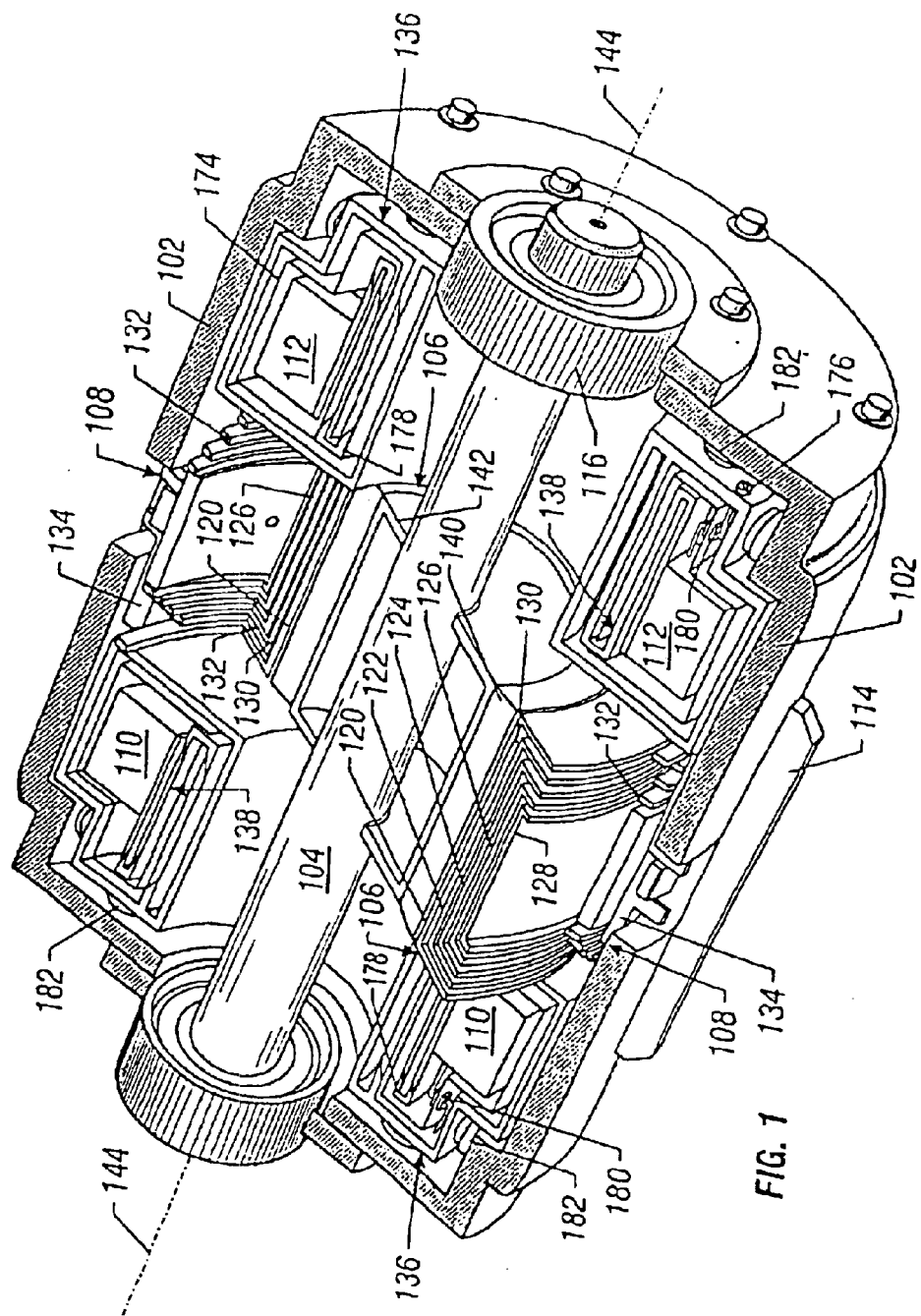
FIG. 1 is a perspective view illustrating the main components of a homopolar machine with two superconducting coils in accordance with the present invention.
Figure 2:
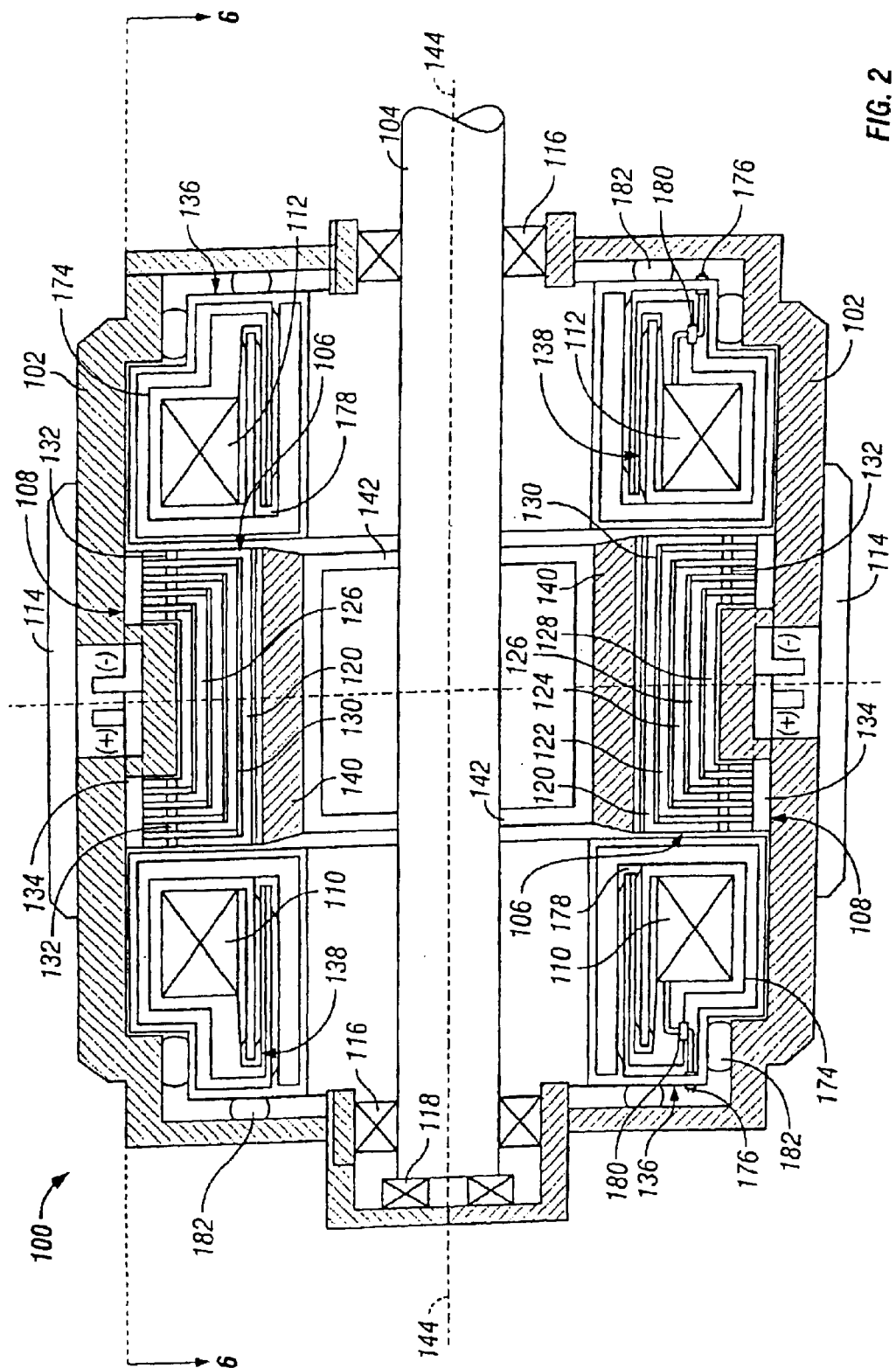
FIG. 2 is a top planar cross-sectional view of the homopolar machine of FIG. 1.

Referring to FIGS. 1 and 2, there is illustrated a homopolar machine 100 in accordance with the present invention. The homopolar machine 100 may be operated as either a direct current (DC) motor or a generator. In general, the homopolar machine 100 includes an outer flux return 102, a shaft 104, an armature assembly 106, several stator-current collector arrays 108, and two field coils 110, 112. The preferred geometry of the homopolar machine 100 is such that the pair of field coils 110, 112 are circumferentially shaped and are mounted in line (along a common z-axis) with the armature assembly 106 located between them. The outer flux return 102 substantially surrounds all the components. By way of example, the homopolar machine 100 may have a radius of approximately 0.5 meters for a poser level of about 5000 HP at 500 RPM.

The outer flux return 102 is preferably substantially cylindrical in shape and is constructed from a material with high magnetic permeability, such as but not limited to, iron or steel. The outer flux return 102 encloses the machine 100's internal components and substantially reduces the amount of magnetic flux radiating from the machine. The outer flux return 102 may serve as a substantial structure that reacts the machine's torsional and magnetic loads and may be augmented with additional structural reinforcement 114.

Figure 3:
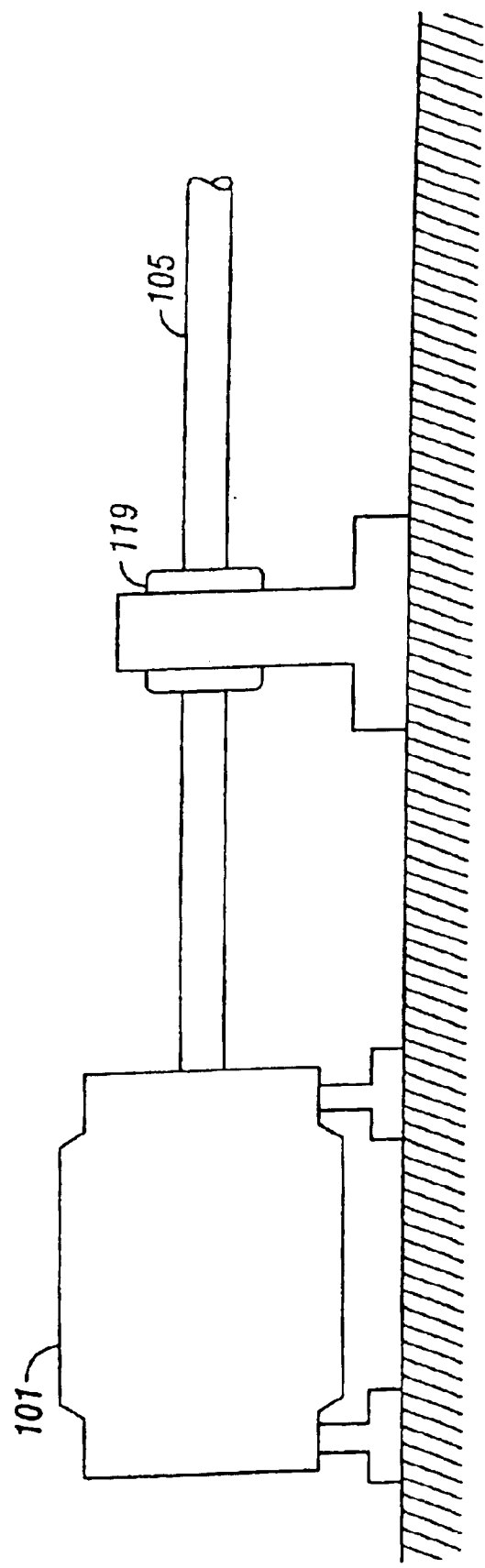
FIG. 3 is a side view illustrating a homopolar machine in accordance with the present invention having an external thrust bearing.

The shaft 104 is supported by radial bearings 116 and a thrust bearing 118. As shown in FIG. 2, the thrust bearing 118 is internal to the homopolar machine 100. Alternatively, FIG. 3 illustrates the scenario where a thrust bearing 119 is external to a homopolar machine 101, being part of an interconnecting drive-train. The thrust bearing 119 maintains the axial position of a shaft 105 in the presence of a large external for, as for example from a ship propeller.

The armature assembly 106 and the stator-current collector arrays 108 are preferably comprised of electrically conductive elements made from copper, copper alloy, or other materials with similar electrical properties. The armature assembly 106 preferably includes a plurality of stacked armature electrical conducting turns 120, 122, 124, 126, 128 separated by electrical insulation 130. The plurality of armature conducting turns 120, 122, 124, 126, 128 are essentially stacked concentric cylinders having a squared-U, radial-axial cross-sectional shape as shown. Each of the conducting turns may be comprised of a single element or a plurality of elements. In the example shown, the armature assembly 106 includes five conducting turns 120, 122, 124, 126, 128. It should be well understood, however, that the armature assembly 106 may include any number of conducting turns. Furthermore, each armature conductor turn 120, 122, 124, 126, 128 is preferably distributed symmetrically around the circumference, therefore resulting in a substantially uniform electric current distribution around the circumference.

The armature conducting turns 120, 122, 124, 126, 128 conduct current to several current collectors 132 and stator conductor turns 134 that are electrically connected in series between the armature conducting turns 120, 122, 124, 126, 128 to form one of the stator-current collector arrays 108. A plurality of stator-current collector arrays 108 are preferably distributed circumferentially and symmetrically around the armature assembly 106 to form the stator. This distribution aids in the desired circumferentially uniform distribution of current throughout all the electrically conductive elements of the machine. The uniformity of current distribution circumferentially around the machine is desirable to prevent thermal hot spots and noise harmonics. The electric current carrying elements may be water-cooled via internal cooling channels, cooled by direct spray of a liquid coolant compatible for use with exposed electrical conductors, forced air or internal circulated gas, or any combination of these methods. Such methods would be chosen based on the requirements and heat dissipation characteristics of the machine.

The field coils 110, 112, which provide the background magnetic field, may be resistive electromagnet coils or superconducting coils. As will be discussed below, the strength of each of the field coils 110, 112 is varied, and therefore, permanent magnets are not used for the field coils 110, 112. Preferably, the field coils 110, 112 are circumferentially continuous in geometry and are superconducting coils that are formed from circumferentially wrapped electrically superconducting wire. Superconducting coils are the preferred choice due to the higher magnetic fields that may be produced, which results in a smaller and lighter motor. Superconducting wire provides zero or nearly zero electrical resistance when cooled to low temperatures. This property allows more electrical current to flow through the coils as compared with ordinary wire, such as copper wire, which allows higher magnetic fields to be produced to obtain more powerful machines for a given size and weight. Thus, superconducting coils do not contribute significantly to the inefficiency of the machine.

For each of the field coils 110, 112 that is manufactured from superconducting wire, a field coil cryostat 136 is provided that is essentially a vacuum vessel. The vacuum vessel has disposed within it the field coils 110, 112, which are structurally supported by cryostat cold-to-warm support structures 138. The field coil cryostat 136 will be discussed in further detail below.

In accordance with the present invention, an inner flux return 140 is positioned around the inner perimeter of the armature assembly 106. The inner flux return 140 is preferably cylindrical in shape and is constructed from a material with high magnetic permeability, such as but not limited to iron, steel or other ferromagnetic material. The inner flux return 140 is mechanically coupled to the machine shaft 104 via a shaft structure 142 which forms part of the inner flux return and is encircled by the armature assembly 106, i.e., circumferentially surrounded by the armature assembly 106. The armature assembly 106 and the inner flux return 40 both comprise a rotor assembly, which is rotationally disposed within the stator (i.e., the plurality of stator-current collector arrays 108). The inner flux return 140 plays an important role in the present invention in that it serves a dual role of producing the axial compensating force and directing the magnetic flux across the armature assembly 106 and stator to enhance flux coupling for higher power utilization.

The field coils 110, 112, outer flux return 102, armature assembly 106, stator current collector arrays 108, and inner flux return 140 are preferably configured in a cylindrical geometry and assembled so they all share a common central geometric axis. The common central geometric axis 144 is also coincident with the rotational axis of the shaft 104 and the central magnetic axis of the field coils 110, 112. During operation, the field coils 110, 112 are energized so that their polarities are opposite, causing their magnetic flux lines to repel and deflect into the inner flux return 140 and outer flux return 102, and across the armature assembly 106 and stator-current collector arrays 108. Because the magnetic fields are uniformly distributed in the circumferential direction, no difference in magnetic flux or multiple magnetic poles are encountered by conductive elements of the armature assembly 106 as it rotates, thus functioning as a homopolar machine.

The outer flux return 102 and the inner flux return 140, being constructed from high magnetically permeable material, direct the magnetic field generated by the field coils 110, 112 substantially towards the region disposed by the armature assembly 106. The field lines generated by the field coils 110, 112 are also directed so that they are substantially parallel to the outward radial direction of current flow through the current collectors 132. This reduces any forces generated within the current collectors 132 that arise from current flow that is non-parallel to the field lines, which reduces current collector deflections in the circumferential direction. These deflections can disturb the contact pressure between the current collector and the armature.

When the homopolar machine 100 is operated as a motor, current is supplied to the rotating armature assembly 106 from the stationary stator via the current collectors 132 located between the armature and the stator. The motor torque is developed as electric current flows at right angles to the flux generated by the stationary field coils 110, 112. When the homopolar machine 100 is operated as a generator, the mechanically-driven rotating armature assembly 106 generates current as its conductive elements are moved at right angles to the flux, and the current is transported to the stationary stator via the current collectors 132.

In accordance with the present invention, the homopolar machine 100 is capable of producing an axial force on the shaft 104 to compensate for external axial forces imposed on the shaft 104. As described above, such external axial forces can be caused, for example, by a connected propellor in a ship motor scenario. In general, the compensating axial force is created by changing the current excitation of the field coils 110, 112, which results in an axial magnetic flux asymmetry in the inner flux return 140.

Figure 4:
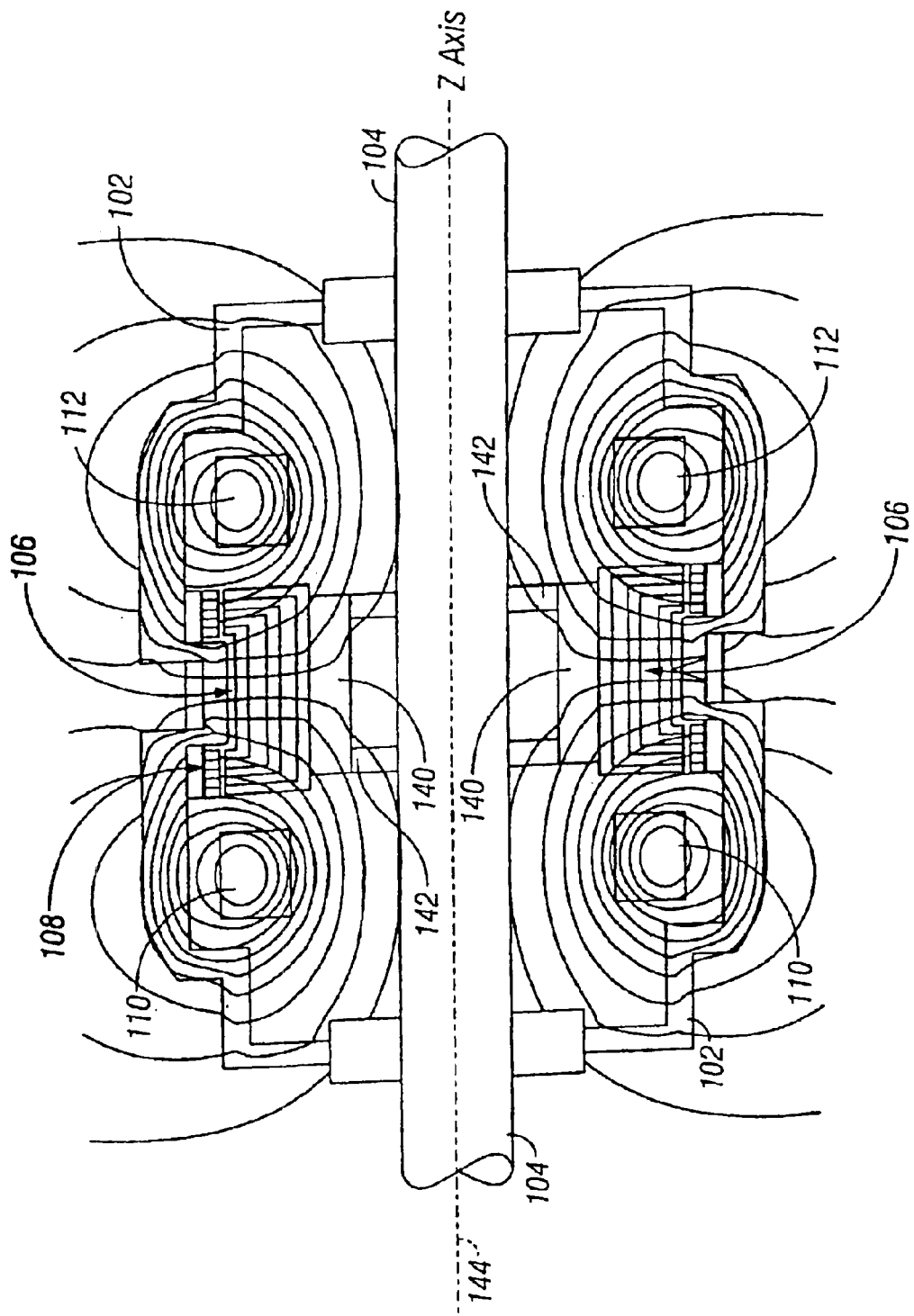
FIG. 4 is a partial top planar cross-sectional view of the homopolar machine of FIG. 1 illustrating the pair of field coils energized to equal but opposite polarity amp-turns and the resulting magnetic fields.

Referring to FIG. 4, when both identical field coils 110, 112 are energized to the same level of current but with opposite polarity, they each produce an equal but opposing magnetic field as shown. The inner flux return 140 deflects the magnetic field lines so that they are focused more strongly in the armature assembly 106 interaction region. Furthermore, the field lines are oriented substantially parallel to the direction of the current flow in the stator-current collector arrays 108 region (radially outward). This orientation reduces the force exerted on the current collectors 132 in the circumferential direction by reducing the current and field line (I×B) force. By way of example, the illustrated homopolar machine 100 may have an outer diameter of 1 meter and be capable of producing 5000 HP at 500 rpm, and in this particular example, the field coils 110, 112 are both energized to produce $1.5 \times 10^6$ Amp-turns.

Figure 5:
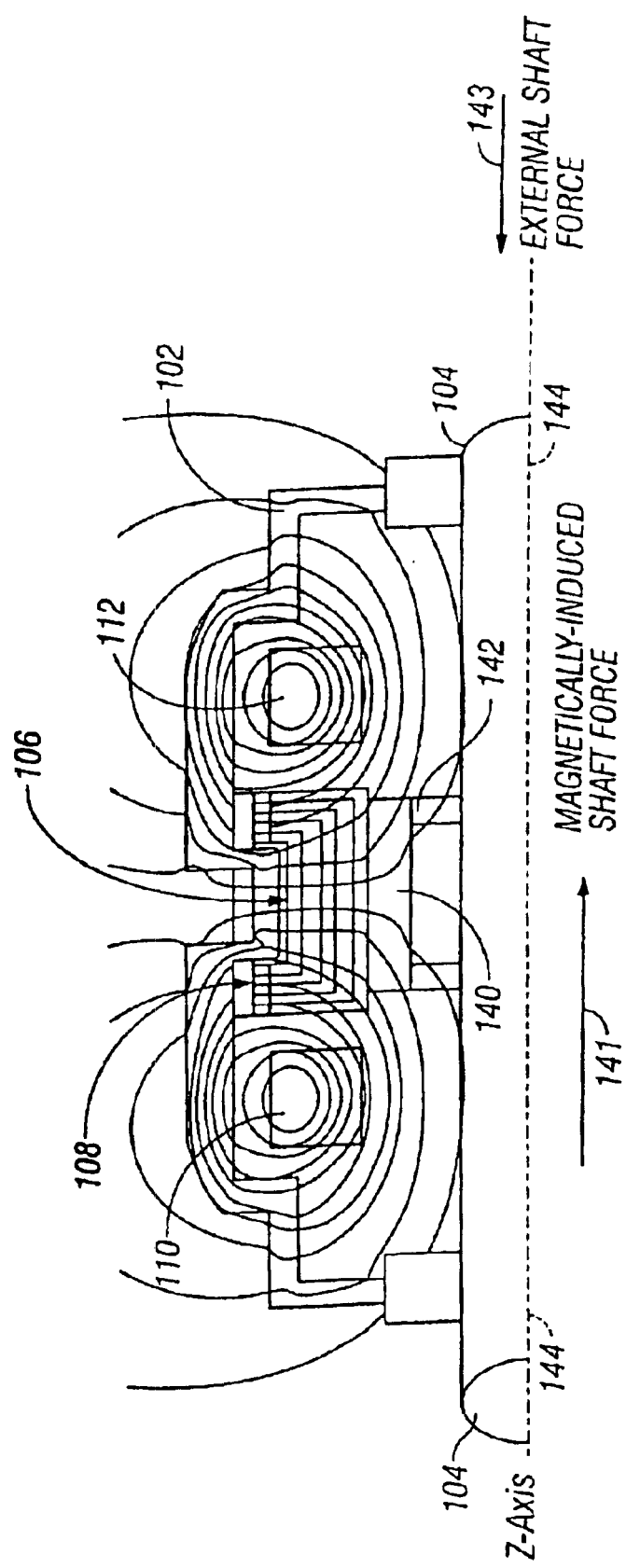
FIG. 5 is a partial top planar cross-sectional view of the homopolar machine of FIG. 1 illustrating the pair of field coils energized to different amp-turns relative to each other causing a magnetic flux asymmetry that produces a compensating axial force in accordance with the present invention.

Referring to FIG. 5, by altering the current flow in the field coils 110, 112 so the current flows (or amp-turns) are different from each other, the homopolar machine 100 produces a compensating axial force 141 on the shaft 104. When the field coils 110, 112 are energized to different amp-turns levels relative to each other, an axial flux asymmetry is caused that produces the axial force 141 on the inner flux return 140 mounted to the shaft 104. External axial forces 143 imposed on the shaft 104 are compensated by the force 141 generated in the inner flux return 140 by the asymmetric magnetic flux. The direction of the compensating axial force 141 is selected to be opposite to that of the thrust bearing load. The force 141 is reacted by the thrust bearing 118, and also by the field coils 110, 112, and into the outer flux return 102 through various interconnecting elements including support structure 138. The compensating axial force 141 reduces the net force on the thrust bearing which helps to reduce thrust bearing wear and increases thrust bearing reliability and reduces noise generated by the thrust bearing.

FIG. 5 illustrates the intended effect where the current in one field coil 110 is raised by 10% and the current in the other field coil 112 is lowered by 10%. In this particular example, the first field coil 110 is energized to $1.35 \times 10^6$ Amp-turns (Peak Field=4.9 Tesla) and the second field coil 112 is energized to $1.65 \times 10^6$ Amp-turns (Peak Field=6 Tesla). The peak magnetic field in the stronger coil 112 is about 6 Tesla, and the average coil current density in it is about 10 $kA/cm^2$. These are reasonable parameters for a low temperature superconducting coil. In this case, the axial force 141 induced on the shaft 104 by the flux asymmetry is predicted to be 20,000 lbs.

The current in the field coils 110, 112 can be altered to produce this compensating force 141, while the total integrated magnetic field-length times current product through the armature remains constant. This means that the rotational torque, and therefore the rotational speed of the homopolar machine 100, need not be interrupted.

Thus, the stationary electromagnetic field coils 110, 112 produce all the magnetic flux necessary for the machine to develop power, and a substantial fraction of this flux is coupled to the inner flux return 140 that is positioned between the field coils 110, 112 and mounted on the rotating shaft 104. An asymmetry in the flux distribution is created by energizing the field coils 110, 112 to different levels, which results in an induced axial force 141 on the rotating shaft 104. The asymmetric axial flux that is created by the field coils 110, 112 is produced by raising the excitation of one field coil and lowering the excitation of the other field coil approximately by the same amount, so the total flux across the armature and stator interaction region remains constant or substantially constant. The current through the armature may be adjusted as necessary to allow the shaft 104's induced axial force 141 component to be varied while the shaft's rotational torque is not affected. The direction of the induced axial force 141 is selected to compensate for mechanical thrust induced on the shaft 104.

The present invention does not rely on additional auxiliary coils since the main field coil pair 110, 112 performs the dual function of producing magnetic flux for rotational torque and axial thrust. Furthermore, it is not necessary to vary the mechanical positioning offset of the shaft 104 relative to the field coil alignment. The homopolar machine 100's magnetic flux path is also designed to reduce magnetically induced forces that may upset the mechanical pressure exerted by the current collectors 132 on the armature assembly 106.

Figure 6:
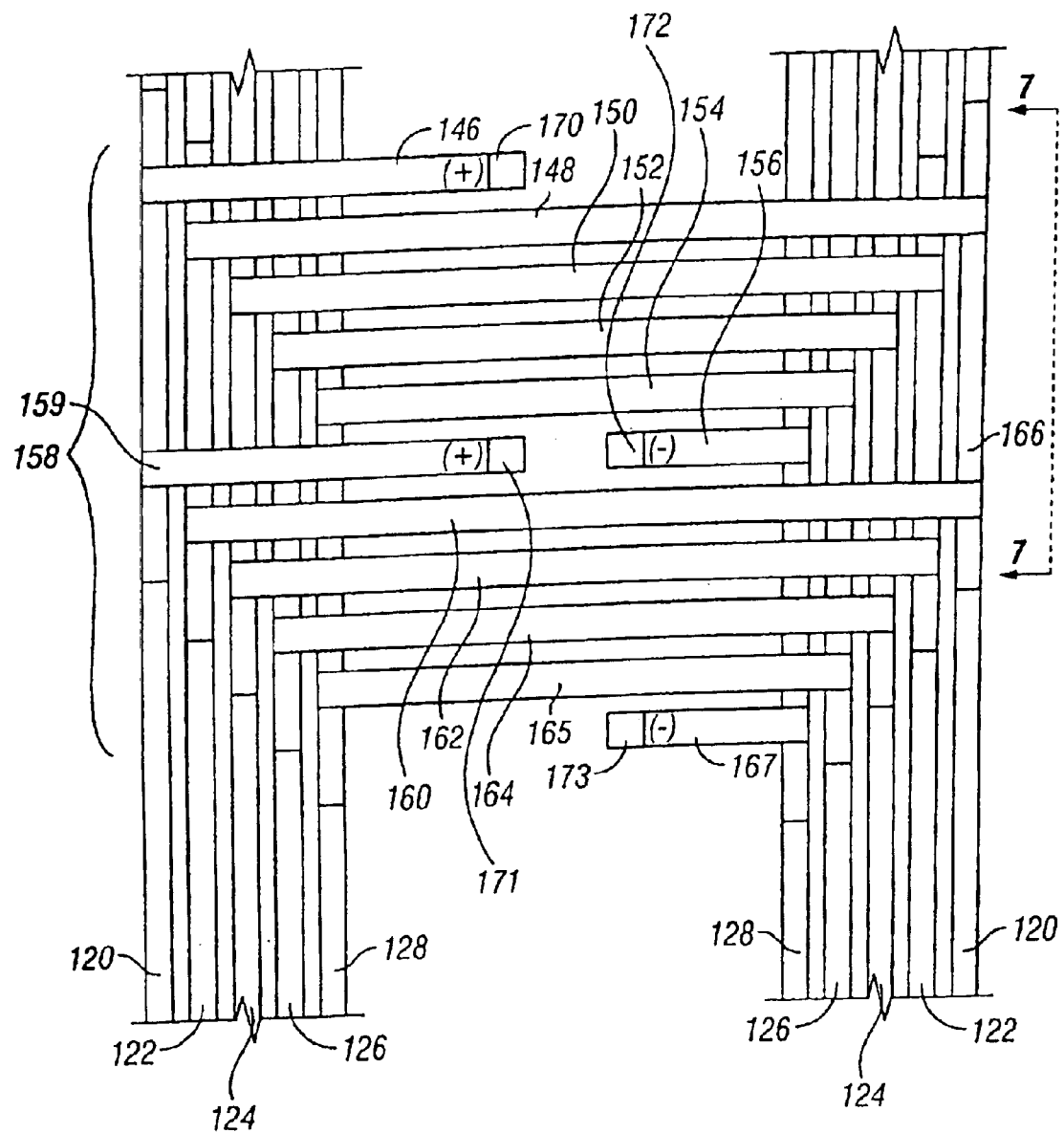
FIG. 6 is a partial side view taken along line 6—6 in FIG. 2 illustrating part of the stator-current collector assembly and part of an armature assembly that may be employed in the homopolar machine of FIG. 1.

Referring to FIG. 6, there is illustrated a top view, looking down on the surface of the rotor, of one complete stator-current collector array 158 and part of the armature assembly 106. The illustrated example is for an armature assembly 106 with five armature conductor turns 120, 122, 124, 126, 128. Again, it should be well understood that the armature assembly 106 may have a different number of armature conductor turns. The stator-current collector array 158 includes stator conductor turns 146, 148, 150, 152, 154, 156, 159, 160, 162, 164, 165, 167. Several stator-current collector arrays 108, like the array 158, are arranged circumferentially around the homopolar machine 100 to distribute the current.

Figure 7:
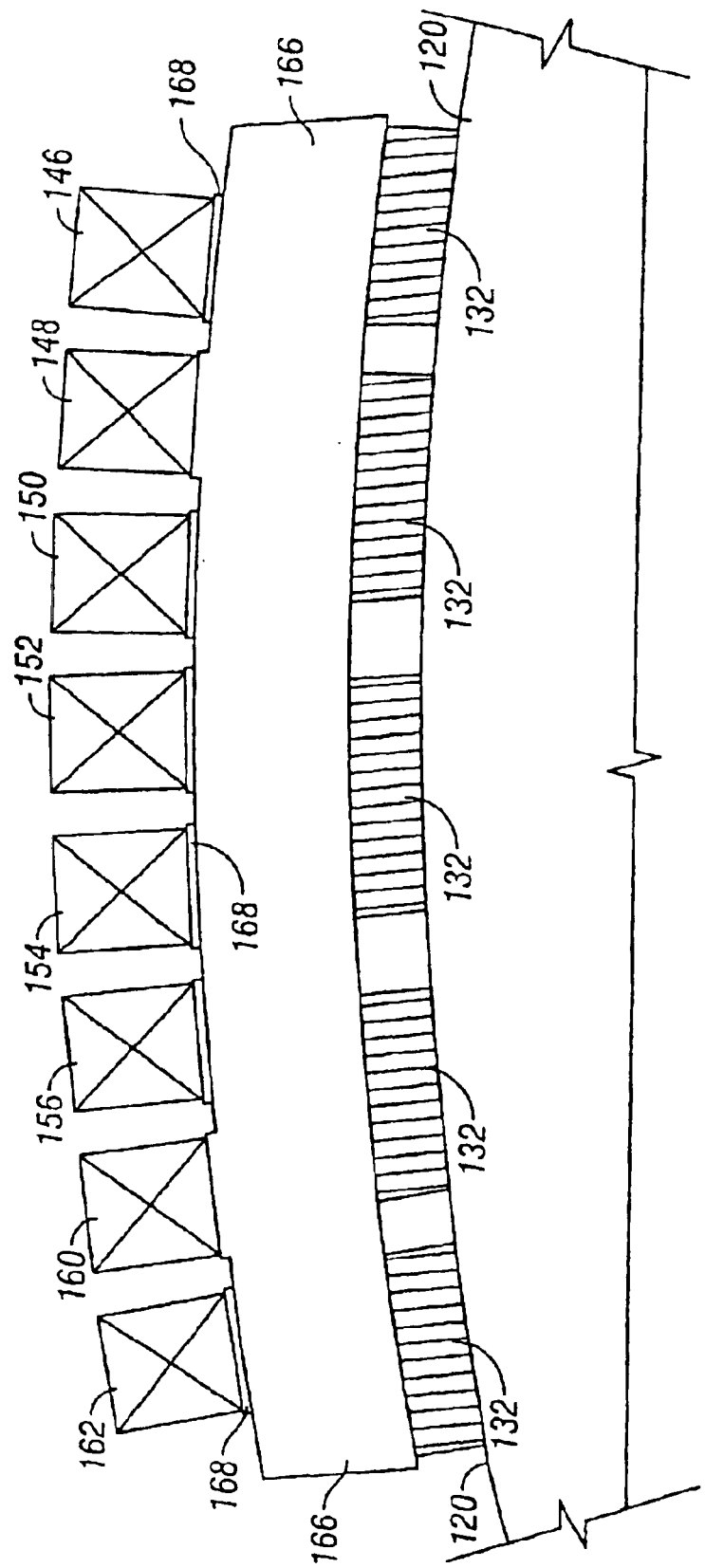
FIG. 7 is an end view as seen from line 7—7 in FIG. 6 of part of the stator-current collector assembly and armature shown in FIG. 6.

FIG. 7 illustrates an end view of a portion of the stator-current collector array 158 and the armature conductor turn 120. The stator conductor turns 148, 160 are electrically connected to their corresponding circumferential busbar 166, while the other illustrated stator conductor turns 146, 150, 152, 154, 156, 162 are electrically insulated from the busbar 166 with electrical stator turn-to-turn insulation 168. The stator conductor turns 146, 150, 152, 154, 156, 162 are electrically insulated from the busbar 166 because they correspond to busbars associated with other circumferential busbars armature conductor turns. Specifically, the stator conductor turn 150 corresponds to a bus bar (not shown) associated with the armature conductor turn 122, the stator conductor turn 152 corresponds to a bus bar (not shown) associated with the armature conductor turn 124, the stator conductor turn 154 corresponds to a bus bar (not shown) associated with the armature conductor turn 126, and the stator conductor turn 156 corresponds to a bus bar (not shown) associated with the armature conductor turn 128. In the illustrated embodiment, pairs of stator turns connect to a common busbar. For example, the stator conductor turns 148 and 160 are electrically in parallel and connect to the busbar 166.

The busbar 166 includes five current collectors 132 that conduct current to or from the armature conductor turn 20. It should be well understood, however, that any number of current collectors 132 may be attached to the busbar 166.

Referring to FIGS. 6 and 7 together, DC electric current is routed through the stator terminals 170, 171, 172, 173 such that current flows between the positive (+) terminals 170, 171 and negative (−) terminals 172, 173. Specifically, current that enters the positive (+) terminals 170, 171 flows through the stator conductor turns 146, 159, then through a circumferential busbar (not shown), then through a current collector (not shown), then through the armature conductor turn 120, then through the current collectors 132, then through the circumferential bus bar 166, then through the stator conductor turns 148, 160, and continues in a similar manner through the remaining armature conductor turns 122, 124, 126, 128, and out the negative (−) terminals 172, 173.

In accordance with the present invention, the current collectors 132 comprise a flexible electrically conductive material, such as but not limited to, electrically conductive fibers or foils made from copper or copper alloys or stacked strips. The current collectors 132 are configured to exhibit a spring rate that results in an applied pressure on the armature conductor turn 120 when connected to the circumferential busbar 166. Furthermore, the current collectors 132 are configured to be free to bear up against the outer edge of the armature turn 120's smooth surface. Thus, the current collectors 132 are flexible such that they bear up against the armature so that the pressure is maintained by the spring constant of the current collector material or by a holder that provides a mechanical and electrical component between the current collectors 132 and circumferential busbar 166.

As the current collectors 132 wear, the pressure will be relaxed only partially because each current collector is flexible owing to its spring constant or the holder accommodates the wear of the brush material. The current collector pressure, however, can be undesirably affected by forces generated on it due to current flowing through it in the presence of a magnetic field. In the present invention, the flux return geometry and field coil configuration are designed so that the magnetic field lines are substantially in the same direction as the direction of the current flow through the current collectors 132, i.e., radially outward. Since the current flowing through the current collectors passes substantially parallel to the field lines, minimal force (I×B) is induced on the flexible collectors 132. The force is minimal enough such that the flexible collectors 132 are not deflected enough to change the contact pressure enough to significantly degrade performance.

The wear rate, electrical resistance losses, and friction losses at the current collector 132 and armature conductor turn 120 interface can be mitigated by the presence of a controlled atmospheric chemical composition within the machine enclosure, or by the addition of moisture in the armature region in the form of water humidity or direct wetting with a liquid compatible for use with exposed electrical conductors.

Figure 8:
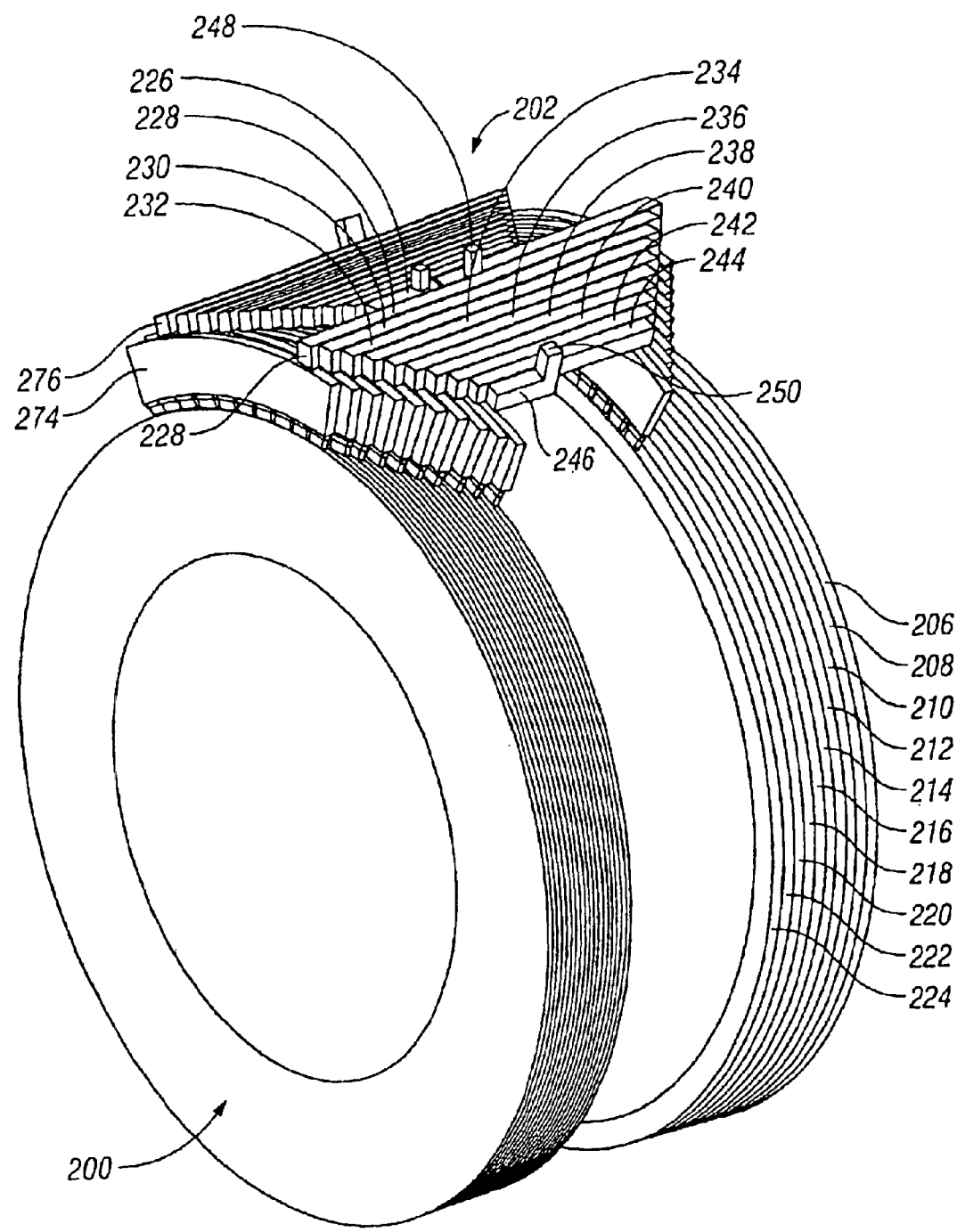
FIG. 8 is a perspective view illustrating a ten conductor turn armature assembly that may be used in accordance with the present invention.

As mentioned above, the armature assembly 106 may have any number of armature conductor turns, and there may be any number of current collectors 132 attached to the busbar 166 with or without interfacing holders for the current collectors 132. By way of example, FIG. 8 illustrates an armature assembly 200 and a stator-current collector array 202 that may be used in accordance with the present invention. Although the armature assembly 200 would typically be encircled by several stator-current collector arrays, only the stator-current collector array 202 is illustrated.

Figure 9:
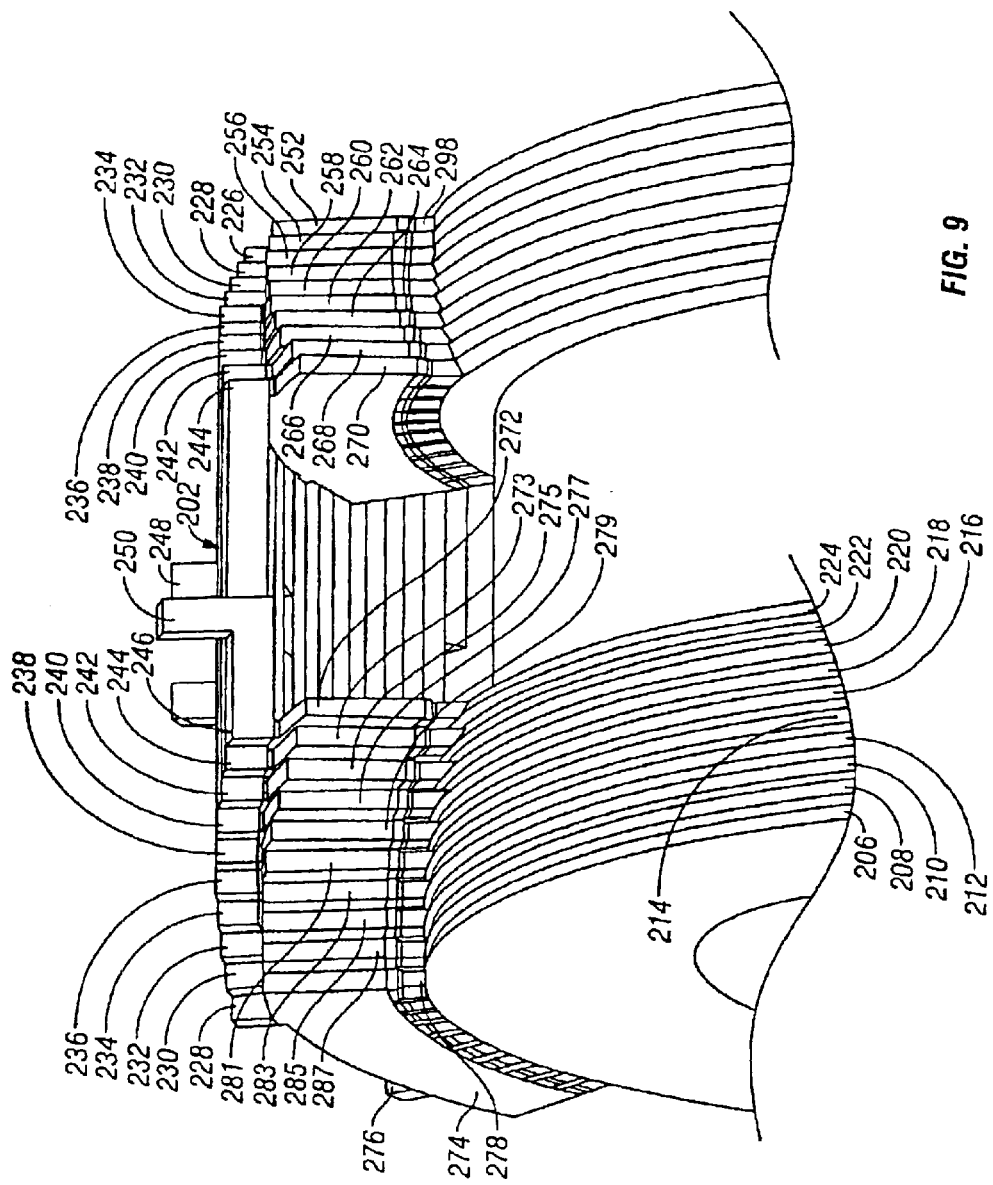
FIG. 9 is a close-up perspective view illustrating a portion of the ten conductor turn armature assembly shown in FIG. 8.

The armature assembly 200 includes ten armature conductor turns 206, 208, 210, 212, 214, 216, 218, 220, 222, 224. The front portion of the stator-current collector array 202 includes stator conductor turns 226, 228, 230, 232, 234, 236, 238, 240, 242, 244, 246, and the terminals 248, 250. Referring to FIG. 9, the stator conductor turns 226, 228, 230, 232, 234, 236, 238, 240, 242, 244, 246 are electrically coupled to the busbars 252, 254, 256, 258, 260, 262, 264, 266, 268, 270, 272, respectively. The stator conductor turns 228, 230, 232, 234, 236, 238, 240, 242, 244, 246 are also electrically coupled to the busbars 274, 287, 285, 283, 281, 279, 277, 275, 273, 272, respectively. Furthermore, the stator conductor turns 228, 276 are electrically coupled to the busbars 274 and 254.

Figure 10:
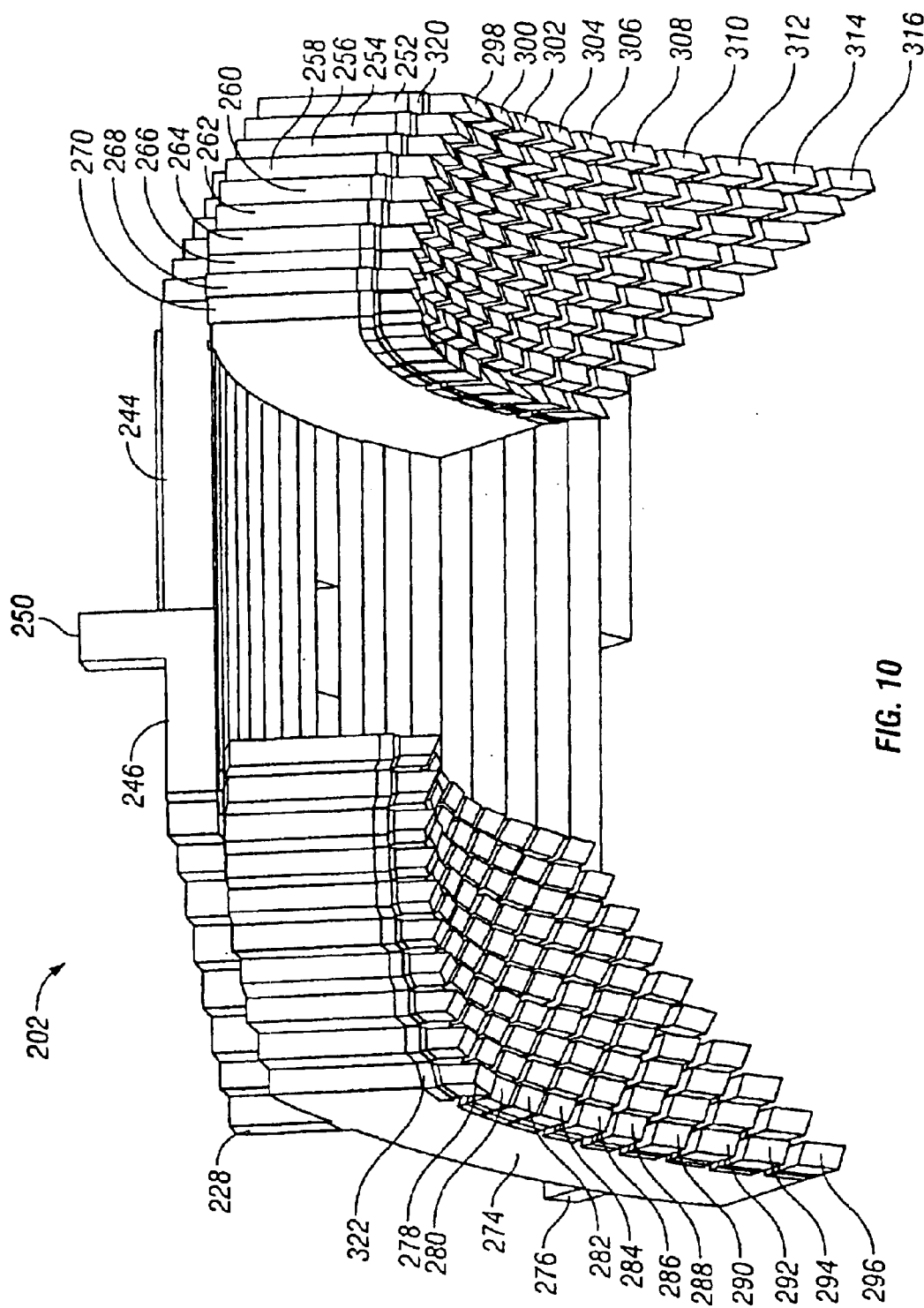
FIG. 10 is a close-up perspective view illustrating the stator-current collector array shown in FIG. 8.

Referring to FIG. 10, each of the busbars includes ten current collectors attached thereto. For example, the busbar 274 includes the ten current collectors 278, 280, 282, 284, 286, 288, 290, 292, 294, 296, and the busbar 252 includes the ten current collectors 298, 300, 302, 304, 306, 308, 310, 312, 314, 316. Thus, any number of current collectors may be attached to the busbars with or without interfacing holders in accordance with the present invention. The current collectors are attached to the busbars by means of brush mounts (also referred to as brush holders or brush mount interfaces). For example, the current collector 298 is attached to the busbar 252 by means of the brush mount 320, and the current collector 278 is attached to the busbar 274 by means of the brush mount 322.

With respect to the field coils 110, 112, superconducting coils are typically constructed by winding superconducting wire. They may be categorized as low temperature superconductors, which typically must operate in the range of 4 K to 12 K, or high temperature superconductors, which may be capable of operating at temperatures up to 80 K. Typical materials for low temperature superconductors included niobium titanium (NbTi) or niobium and tin ($Nb_3Sn$), both of which are typically formed in a matrix with copper or copper alloys to form wire. High temperature superconductors use other constituents, such as BSCCO (Bismuth Spartium Carbon Copper Oxide) or YBCO (Yttrium Barium Copper Oxide) formed in a metal matrix, typically silver.

Superconducting coils, either high or low temperature, are typically structurally suspended within a cryostat. A cryostat is comprised of a vacuum vessel and a support structure that suspends the coil within it so reduced heat flows into the coil from the structure. The support structure itself is typically strong enough to support the coil against various forces that may be present. The field coils 110, 112 may be cooled within the cryostat 136 by a cryogenic fluid such as liquid helium which typically operates at a temperature of 4.2 K, or other cryogenic fluids can be used such as liquid nitrogen at 77 K, if the superconducting coil is designed to operate at that temperature. The field coils 110, 112 may also be cooled by devices known as cryocoolers, which are closed cycle cryogenic refrigeration devices that can lower the field coil's temperature to the required level.

With respect to the field coil cryostat 136, the cryostat cold-to-warm support structure 138 is preferably comprised of materials strong enough to physically support the field coil 110, 112 while reducing the amount of heat that can flow to it from the vacuum vessel, which is at room temperature. Because they are superconducting coils, the field coils 110, 112 are at a much colder temperature, typically in the range of 4 K to 12 K for low temperature superconductors and up to 80 K for high temperature superconductors.

Each of the field coils 110, 112 may be cooled by connecting them to devices called "cryocoolers" via thermally conducting links (not shown). The cryocoolers are generally part of a closed cycle refrigeration system. Another method that can be used to cool the field coils 110, 112 to required temperature makes use of another vessel (not shown) disposed between the coil and the vacuum vessel. The vessel is filled with a liquid cryogen, such as but not limited to liquid helium, liquid hydrogen, or liquid nitrogen, depending on the temperature requirements of the superconductor material used in the field coils 110, 112. In either method, a cryostat thermal shield 174, comprising a thermally conductive material such as but not limited to copper or aluminum, is preferably disposed between the cryostat vacuum vessels and the field coils 110, 112. The cryostat thermal shield 174 is attached to the cryostat cold-to-warm support structure 138 to intercept heat conducted and radiated inward from the cryostat vacuum vessel walls and the field coil current leads 176 that would otherwise leak into the field coils 110, 112.

The heat is intercepted at thermally conductive mechanical connections 178 between the cryostat cold-to-warm support structure 138 and the cryostat thermal shield 174, and also at an electrically insulated but thermally conductive mechanical connection 180 between the field coil current leads 176 and the cryostat thermal shield 174. The intercepted heat is removed by the cryocooler (not shown) which is connected to the thermal shield 174, or in the case where a second inner vessel filled with liquid cryogen is used (not shown), the heat may be removed through conduction of the cryogen's boil-off gases that would be routed through a thermally conductive material attached to the cryostat thermal shield 174. The field coil cryostats 136 are mechanically supported by the outer flux return 102 via the cryostat mounts 182.

Figure 11:
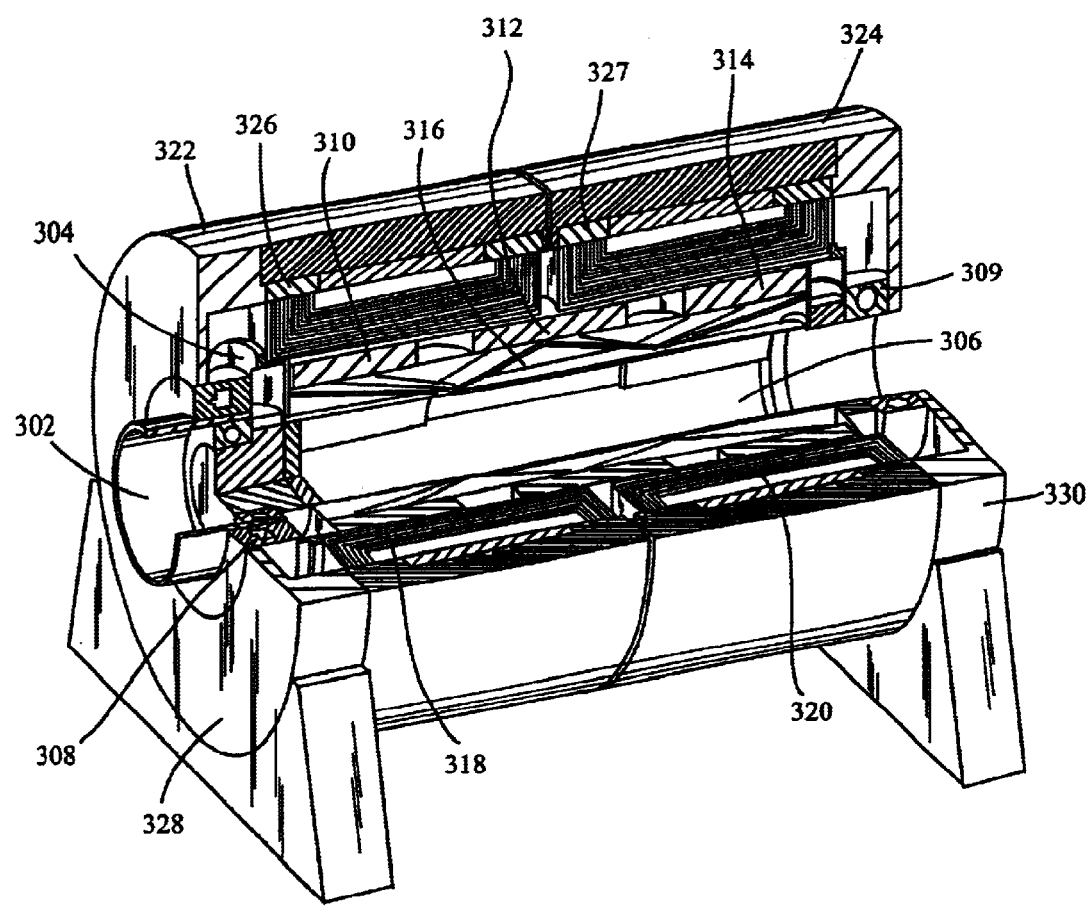
FIG. 11 is a perspective view illustrating the main components of a homopolar machine with three superconducting coils in accordance with another embodiment of the present invention.

FIG. 11 is a perspective view illustrating the main components of a homopolar machine in accordance with another embodiment of the present invention. Shown is a drive shaft 302, a torque tube 304, a cryostat vacuum vessel 306, a first bearing 308, a second bearing 309, a first superconducting coil 310, a second superconducting coil 312, a third superconducting coil 314, a plurality of superconducting coil supports 316, a first active armature 318, a second active armature 320, a first stator module 322, a second stator module 324, a first plurality of brushes 326, a second plurality of brushes 327, a first end cap 328, and a second end cap 330.

Figure 12:
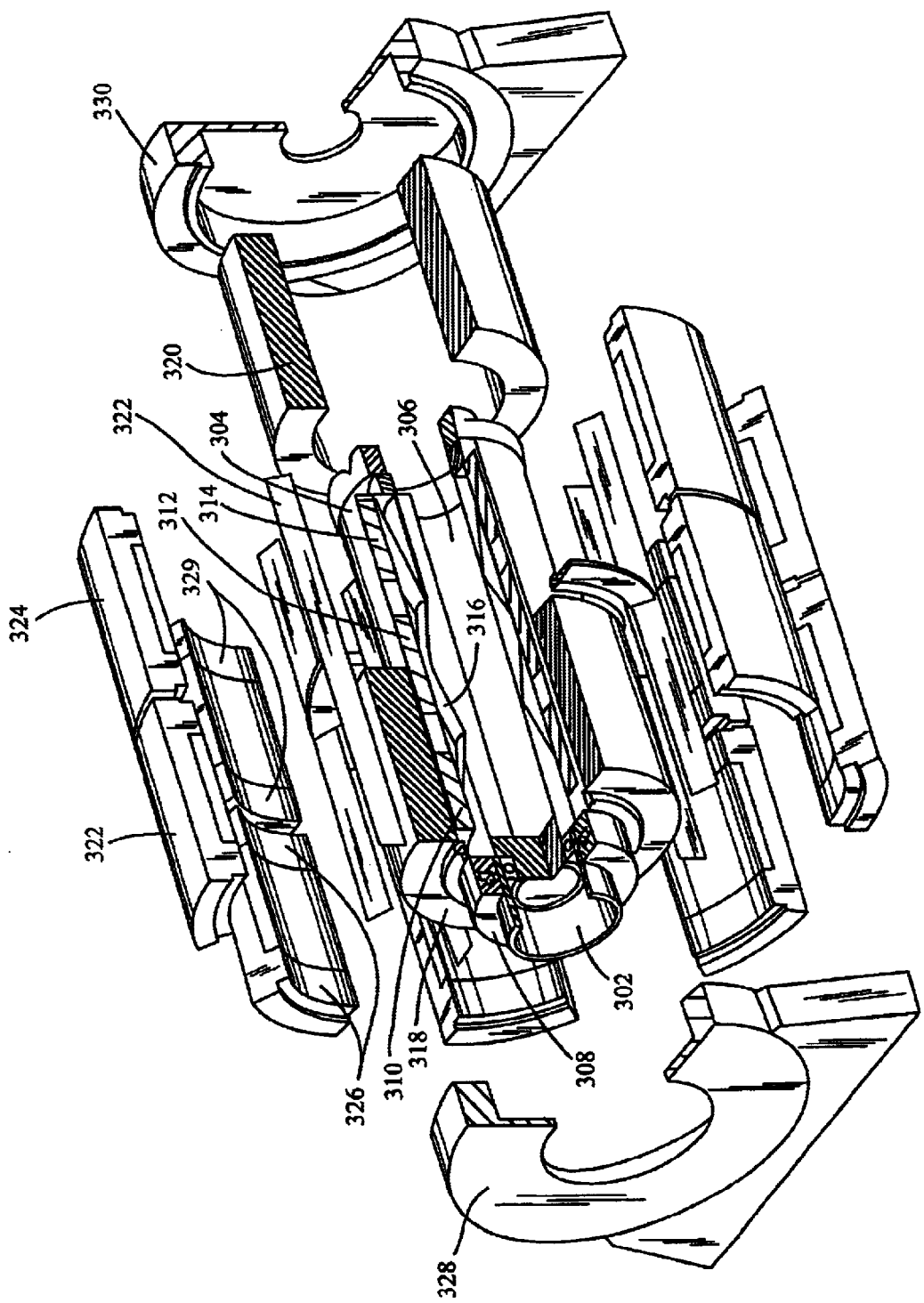
FIG. 12 is an exploded perspective view illustrating the main components of the homopolar machine of FIG. 11.
Figure 13:
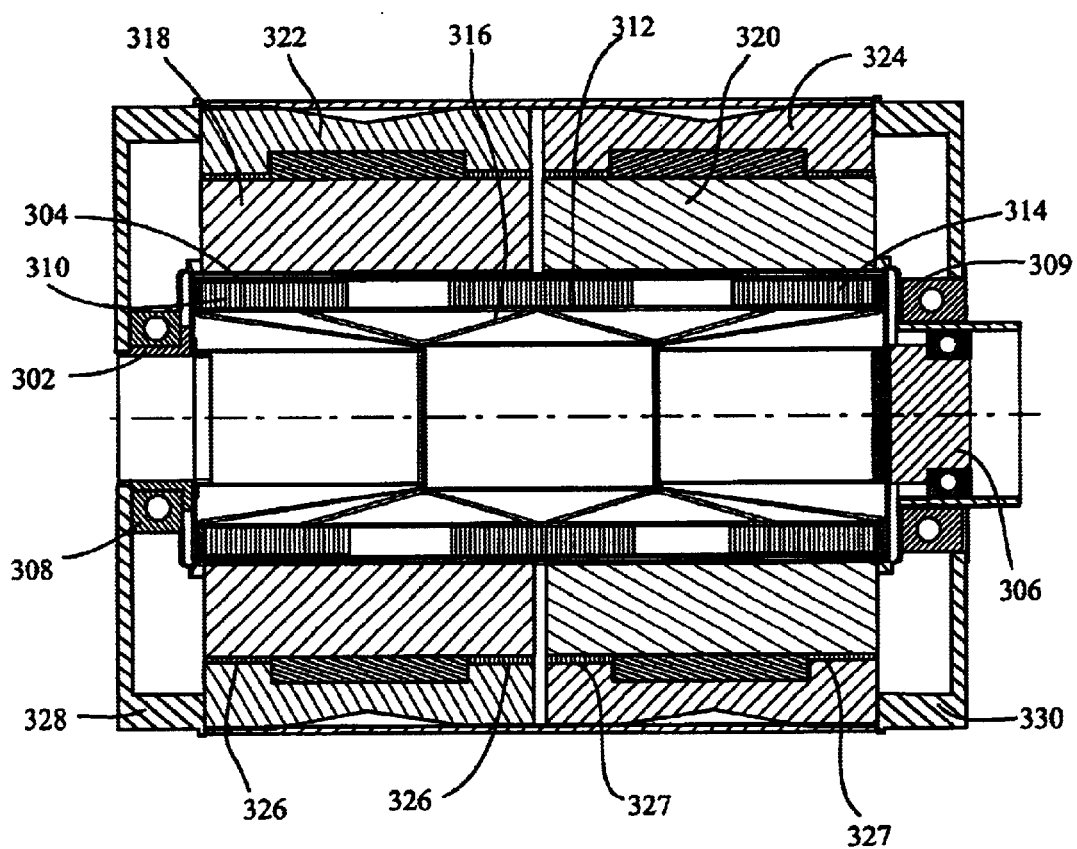
FIG. 13 is a top planar cross-sectional view of the homopolar machine of FIG. 11.

The homopolar machine shown in FIGS. 11–13 functions similarly in many aspects to the homopolar machine shown in FIG. 1. The homopolar machine of FIGS. 11–13 has been modified to incorporate an additional superconducting coil and an additional armature. The present invention can also incorporate additional superconducting coils and additional armatures as needed without deviating from the scope of the present invention.

Advantageously, the embodiment shown in FIGS. 11–13 provide for a homopolar machine in accordance with the present invention which has an increased overall power and an increased torque density. In this embodiment, the first active armature 318 and the second active armature 320 are both coupled to the torque tube 304. The torque tube 304 is coupled to the drive shaft 302 of the homopolar machine.

The first superconducting coil 310, the second superconducting coil 312, and the third superconducting coil 314 are mounted within the cryostat vacuum vessel 306. The cryostat vacuum vessel 306 is stationary and provides central access for current leads and cryocooler, which cools the superconducting coils 310, 312, 314. In one embodiment the cryostat vacuum vessel 306 can be stainless steel and the superconducting coils 310, 312, 314 can be made from NbTi (Niobium Titanium). It should be understood that other materials can be used for the cryostat vacuum vessel 306 and the superconducting coils 310, 312, 314 without deviating from the scope of the present invention.

The first superconducting coil 310, the second superconducting coil 312, and the third superconducting coil 314 are conduction cooled via an interface with a cryocooler (not shown). The first superconducting coil 310, the second superconducting coil 312, the third superconducting coil 314 are thermally isolated from the room temperature outer wall of the cryostat vacuum vessel 306 by being mounted on the plurality of superconducting coil supports 316. The plurality of superconducting coil supports 316 is formed from composite materials, however, many materials may be used in accordance with the present invention. Additionally, an intermediate temperature thermal shield, which is a series of nested cylinders and cones is located between the cold coils and the warm outer shell of the cryostat vacuum vessel 316 to reduce the heat to the superconducting coils 310, 312, 314.

The first active armature 318 and the second active armature 320 are mounted on the outside of the torque tube 304. The torque tube 304 is then coupled to the drive shaft 302, such that the torque tube 304 rotates with the drive shaft 302. The first active armature 318 and the second active armature 320 both include an inner flux return and an armature assembly. The first active armature 318 and the second active armature 320 interface with the first plurality of brushes 326 and the second plurality of brushes 327 mounted on the brush holders. The brush holders are coupled to the stator bars which are in 8 pairs of stator segments. It should be understood that a different number of pairs of stator segments can be used without deviating from the scope of the present invention. The configuration of the stator bars is shown in greater detail with reference to FIG. 15.

As with the embodiment shown in FIG. 1, the first superconducting coil 310, the second superconducting coil 312, and the third superconducting coil 314 are positioned such that the Lorentz forces (I×B) on the first plurality of brushes 326 and the second plurality of brushes 327 is substantially parallel to the current flow which reduces the Lorenz forces on the brushes. The size, shape, and location of the superconducting coils and any magnetically permeable elements are adjusted such that the magnetic field in the area of the plurality of brushes is aligned as much as is practical with the current flowing in the plurality of brushes. This reduces the vector cross product (I×B) and, in turn, reduces the forces on the brushes and the brush holders.

In this configuration the brushes maintain substantially constant contact pressure with either the first active armature 318 or the second active armature 320 in the presence of the high magnetic fields created by the first superconducting coil 310, the second superconducting coil 312 and the third superconducting coil 314. Because the magnetic field lines are oriented in the same general direction as the direction of current flow as much as is practical, the I×B force that would disturb the contact pressure is reduced. The first plurality of brushes 326 and the second plurality of brushes 327 are flexible and may be made from either electrically conductive fibers or stacked strips such that they bear up against the first active armature 318 and the second active armature 320, respectively, such that the pressure is also maintained by the spring constant of the brushes or the brush holders.

FIG. 12 is an exploded perspective view of the homopolar machine of FIG. 11. Additionally shown in FIG. 12 is a support frame structure 332. The support frame structure 332 provides support for the homopolar machine. The support frame structure 332 is located in between the pairs of stator modules and in between the first active armature 318 and the second active armature 320.

FIG. 13 is a cross-sectional view illustrating the homopolar machine of FIG. 11. Shown is the drive shaft 302, the torque tube 304, the cryostat vacuum vessel 306, the first bearings 308, the second bearing 309, the first superconducting coil 310, the second superconducting coil 312, the third superconducting coil 314, the plurality of superconducting coil supports 316, the first active armature 318, the second active armature 320, the first stator module 322, the second stator module 324, the first plurality of brushes 326, the second plurality of brushes 327, the first end cap 328, and the second end cap 330.

The first stator module 322 and the second stator module 324 help direct the magnetic field generated by the first superconducting coil 310, the second superconducting coil 312, and the third superconducting coil 314 such that the Lorentz forces (I×B) on the first plurality of brushes 326 and the second plurality of brushes 327 are reduced. Reduction in the Lorentz forces on the brushes helps to maintain a constant contact pressure between the brushes and the active armatures.

Figure 14:
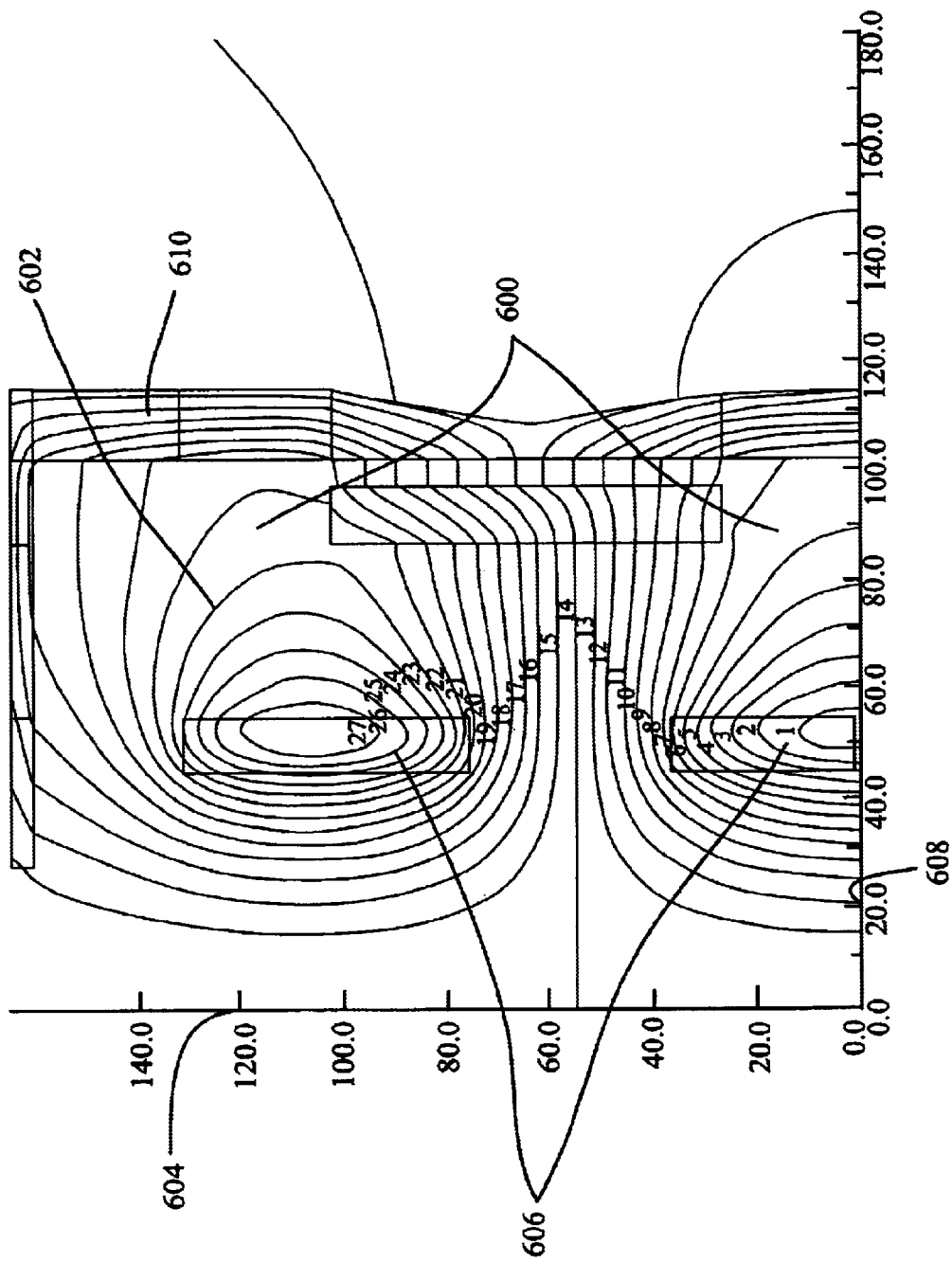
FIG. 14 is a partial cross-sectional view illustrating the magnetic fields generated by the superconducting coils of the homopolar machine of FIG. 11.

FIG. 14 is a partial cross sectional view illustrating magnetic field lines in accordance with the homopolar machine of FIG. 11. Shown is a plurality of regions for brushes 600, one of a plurality of magnetic field lines 602, a machine axis 604, a plurality of superconducting coils 606, a plane of symmetry 608 and a housing 610. Shown is a cross-section of ¼ of the entire homopolar machine of FIG. 11.

The housing 610 supports the homopolar machine and aids in shaping the magnetic field created by the plurality of superconducting coils 606. The magnetic field is represented by the plurality of magnetic field lines 602. The housing 610 helps to direct the magnetic field such that the lateral electromagnetic forces on the brushes of the homopolar machine are reduced. The housing 610 is typically made of iron, however, other materials which help direct the magnetic fields lines can be used.

The plurality of regions for the brushes 600 show approximately where the brushes of the homopolar machine are located. The brushes are located and oriented relative to the field lines such that optimization of the torque generation on the rotating parts is achieved. Additionally, the brushes are oriented so that the current is aligned as much as is practical with the local magnetic field lines so as to reduce the lateral electromagnetic forces on the brushes. As previously described herein, the lower the I×B force on the brushes, the more a constant contact pressure is maintained between the brushes and the armature. In one embodiment, the magnetic field is entirely parallel to the plurality of brushes, such that there in no I×B force on the brushes. In another embodiment, the orientation of the brushes will be such that there are some magnetic field forces acting on the brushes, however, the brushes are oriented so the magnetic field forces are reduced as much as is practical.

Figure 15:
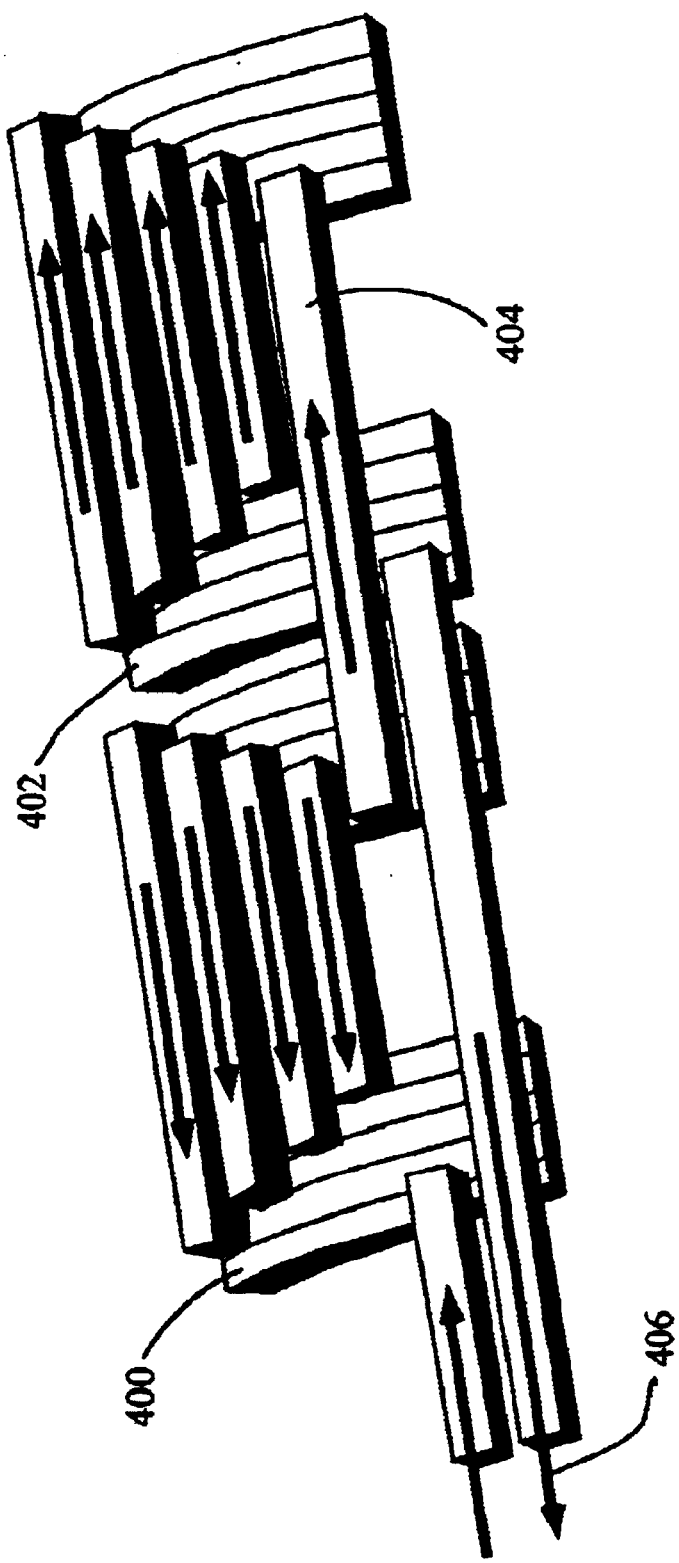
FIG. 15 is a isometric view of part of the stator for the homopolar machine of FIG. 11.

FIG. 15 is a perspective view illustrating the stator bars connected to a pair of stator segments. Shown is a first stator segment 400, a second stator segment 402, a plurality of stator bars 404 and arrows 406 illustrating the direction of current flow.

The plurality of stator bars 404 are coupled to the first stator segment 400 and the second stator segment 402 as shown. The configuration shown in FIG. 14 illustrates one manner which allows current flow to be transferred properly among the turns in the first active armature 318 and the second active armature 320. Five turns are shown for illustrative purposes, however, for 25 MW and 36.5 MW motors, approximately 15 and 17 turns can be used, respectively. It should be understood that the number of turns can vary while not deviating from the present invention.

The plurality of stator bars 404 are additionally coupled to brush holders (not shown). The brush holders provide mounting for the brushes. The brushes provide an electrical connection to the first active armature 318 and the second active armature 320.

As describe above with reference to FIGS. 4 and 5, in accordance with the present invention, the homopolar machine 100 is capable of producing an axial force on the shaft 104 to compensate for external axial forces imposed on the shaft 104. External axial forces can be caused, for example, by a connected propellor in a ship motor scenario. In general, the compensating axial force is created by changing the current excitation of the field coils 110, 112, which results in an axial magnetic flux asymmetry in the inner flux return 140. Similarly, with respect to the embodiment shown in FIGS. 11–13, the homopolar machine is capable of producing an axial force on the drive shaft 302. The compensating force is created by changing the current excitation of the superconducting coils 310, 312, 314, which results in an axial magnetic flux asymmetry on the inner flux return of one or both of the first active armature 318 and the second active armature 320. The first active armature 318 and the second active armature 320 are coupled to the torque tube 304 which is coupled to the drive shaft 302. Thus, the compensating force on the inner flux return is transferred to the drive shaft 302.

Figure 16:
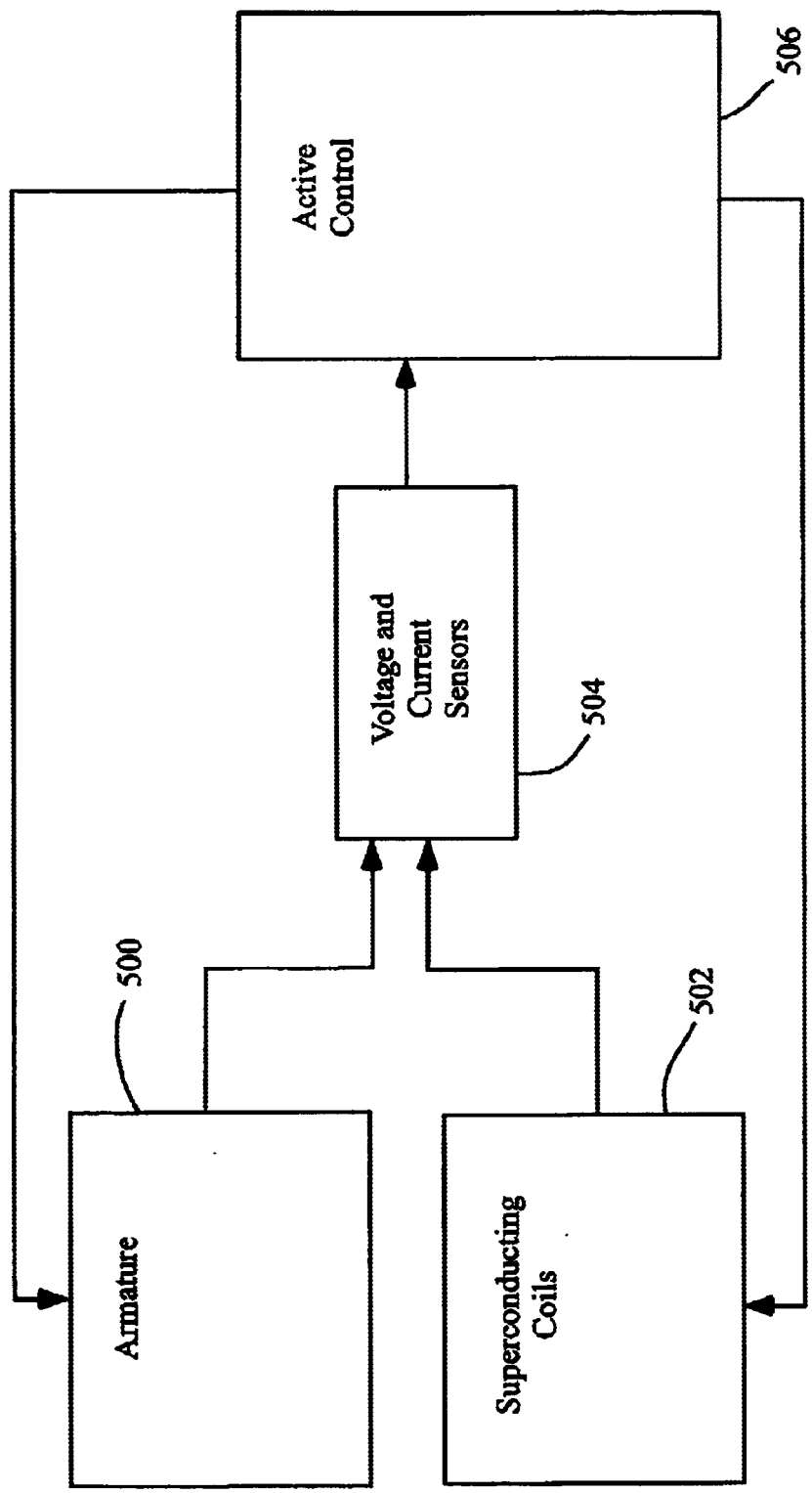
FIG. 16 is a block diagram illustrating a feedback system for controlling the compensating force on the shaft in accordance with another embodiment of the present invention.

FIG. 16 is a block diagram illustrating a feedback system for controlling the compensating axial force in accordance with the present invention. Shown is an armature block 500, a superconducting coil block 502, a voltage and current sensor block 504, and an active control block 506.

The system allows for active control of the armature current and the armature voltage as well as active control of the currents in the superconducting coils. The torque produced by the homopolar machine shown in either FIG. 1 or FIG. 11 is dependent upon the armature current and the field level produced by the superconducting coils. The voltage required by the homopolar machine is determined by the operating speed of the homopolar machine and the field levels created by the superconducting coils. The active control block 506 thus provides for the ability to unload the thrust bearing by adjusting the relative magnitude of the current in the plurality of superconducting coils. The voltage and current sensor block 504, thus provides for the monitoring of the armature current and the armature voltage. Active control of the currents in the superconducting coils and the currents and voltages in the armatures allow the homopolar machine to operate with a reduced axial load condition on the thrust bearing in an automated and real time fashion while maintaining the desired torque and RPM.

While the invention herein disclosed has been described by the specific embodiments and applications thereof, numerous modifications and variations could be made thereto by those skilled in the art without departing from the scope of the invention set forth in the claims.

What is claimed is:

1. A homopolar machine comprising:
    a shaft;
    a plurality of armature assemblies, coupled to the shaft, that includes a plurality of armature conductor turns;
    a plurality of current collectors that provide a sliding electrical current interface with the plurality of armature conductor turns; and
    means for maintaining substantially constant contact pressure of the current collectors with the plurality of armature conductor turns in the presence of high magnetic fields produced by a plurality of superconducting field coils.

2. A homopolar machine in accordance with claim 1 further comprising a torque tube coupled to the shaft and the plurality of armature assemblies.

3. A homopolar machine in accordance with claim 1 further comprising a cryostat vessel for housing a first superconducting field, a second superconducting field coil and a third superconducting field coil.

4. A homopolar machine in accordance with claim 1 further comprising a first superconducting field, a second superconducting field coil and a third superconducting field coil.

5. A homopolar machine comprising:
    a shaft;
    an armature assembly, coupled to the shaft, that includes a plurality of armature conductor turns; and
    a plurality of stator-current collector arrays that encircle the armature assembly, each stator-current collector array including a plurality of current collectors that maintain substantially constant contact pressure with the armature conductor turns in the presence of a high magnetic field to provide a sliding electrical current interface with the armature conductor turns;
    wherein the plurality of stator-current collector arrays is oriented such that the high magnetic field is substantially parallel to a direction of current flow in a region where at least one of the plurality of stator-current collectors contacts one of the armature conductor turns to reduce induced magnetic forces that may deflect the current collector.

6. A homopolar machine in accordance with claim 5 further comprising a second armature assembly coupled to the shaft.

7. A homopolar machine in accordance with claim 6 further comprising:
    a torque tube coupled to the shaft; and
    a first superconducting field coil, a second superconducting field coil, and a third superconducting field coil enclosed within the torque tube.

8. A homopolar machine in accordance with claim 5 further comprising an outer flux return that encloses the plurality of armature assemblies.

9. A method of operating a homopolar machine, comprising the steps of:
    rotating a plurality of armature assemblies that include a plurality of armature conductor turns;
    creating a magnetic field through the plurality of armature assemblies;
    providing a plurality of stator-current collector arrays that encircle the plurality of armature assemblies, each stator-current collector array including a plurality of current collectors which provide a sliding electrical current interface with the armature conductor turns;

reducing induced magnetic forces that may deflect the current collectors by directing magnetic field lines substantially parallel to a direction of current flow in a region where at least one of the plurality of current collectors contact the armature conductor turns; and maintaining substantially constant contact pressure between the plurality of current collectors and the plurality of armature assemblies in the presence of the magnetic field.

10. A method in accordance with claim 9, wherein the step of creating a magnetic field through the plurality of armature assemblies comprises the step of creating a magnetic field through the plurality of armature assemblies with three superconducting field coils.

11. A method in accordance with claim 9, wherein each of the current collectors comprises a solid material.

12. A method in accordance with claim 9, wherein each of the current collectors comprises a flexible, electrically conductive material.

13. A method in accordance with claim 9, wherein each of the current collectors comprises electrically conductive fibers made from copper.

14. A method in accordance with claim 9, wherein each of the current collectors comprises electrically conductive fibers made from copper alloys.

15. A method in accordance with claim 9, wherein each of the current collectors comprises electrically conductive foils made from copper.

16. A method in accordance with claim 9, wherein each of the current collectors comprises electrically conductive foils made from copper alloys.

17. A method of operating a homopolar machine, comprising the steps of:

energizing superconducting field coils in the homopolar machine to create a magnetic field through a plurality of armature assemblies, each of the plurality of armature assemblies including a plurality of armature conductor turns;

supplying current to a plurality of current collectors that provide a sliding electrical current interface with the plurality of armature conductor turns; and maintaining an orientation of the plurality of current collectors and the magnetic field so that magnetic field lines are directed substantially parallel to a direction of current flow in a region where at least one of the plurality of current collectors contact the armature conductor turns to reduce induced magnetic forces on the plurality of current collectors.

18. A method in accordance with claim 17, wherein each of the current collectors comprises a solid material.

19. A method in accordance with claim 17, wherein each of the current collectors comprises a flexible, electrically conductive material.

20. An apparatus that includes a homopolar machine, the homopolar machine comprising:

a shaft:

an armature assembly coupled to the shaft; and a plurality of superconducting coils configured to produce a magnetic field asymmetry for generating an axial force on the shaft to compensate for an external axial force imposed on the shaft.

21. An apparatus in accordance with claim 20 further comprising a feedback system for controlling the magnetic field and the current and voltage in the armature assembly.

22. A homopolar machine in accordance with claim 20, further comprising an outer flux return comprising a geometry that directs magnetic field lines substantially parallel to a direction of current flow in a region where a plurality of current collectors contact the armature assembly to reduce induced magnetic force that may deflect the current collectors in a circumferential direction.

23. A homopolar machine in accordance with claim 22, wherein each of the current collectors comprises a flexible, solid material that is coupled to a respective stator-current collector array so that it bears up against an outer rotating rim of the armature assembly.

24. A homopolar machine in accordance with claim 22, wherein each of the current collectors comprises a flexible, solid electrically conductive material.

25. A homopolar machine in accordance with claim 22, wherein each of the current collectors comprises electrically conductive fibers made from copper.

26. A homopolar machine in accordance with claim 22, wherein each of the current collectors comprises electrically conductive fibers made from copper alloys.

27. A homopolar machine in accordance with claim 22, wherein each of the current collectors comprises electrically conductive foils made from copper.

28. A homopolar machine in accordance with claim 22, wherein each of the current collectors comprises electrically conductive foils made from copper alloys.

29. A method of operating a homopolar machine comprising:

rotating an armature assembly coupled to a shaft wherein the shaft rotates with the armature assembly;

energizing a first field coil in the homopolar machine to a first excitation level to generate a first magnetic field through the armature assembly coupled to the shaft; and energizing a second field coil in the homopolar machine to a second excitation level to generate a second magnetic field through the armature assembly wherein the second excitation level is different than the first excitation level for producing a magnetic field asymmetry that generates an axial force on the shaft to compensate an external axial force imposed on the shaft.

30. A method of claim 29 further comprising adjusting the excitation level in one of the first field coil and the second field coil in response to a feedback signal.

31. A method of claim 29 further comprising energizing a third field coil in the homopolar machine to a third excitation level to generate second magnetic field though a second armature assembly coupled to the shaft.

32. A method of claim 29 further comprising measuring one of the armature current and the armature voltage to determine the feedback signal.

33. A method of claim 29 further comprising rotating an second armature assembly coupled to the shaft wherein the shaft rotates with the second armature assembly.

* * * * *

UNITED STATES PATENT AND TRADEMARK OFFICE
CERTIFICATE OF CORRECTION

| | |
|---|---|
| PATENT NO. | : 6,856,062 B2 |
| DATED | : February 15, 2005 |
| INVENTOR(S) | : Michael Heiberger et al. |

It is certified that error appears in the above-identified patent and that said Letters Patent is hereby corrected as shown below:

<u>Title page,</u>
Item [56], References Cited, U.S. PATENT DOCUMENTS, "5,027,280" reference, please change "364/474" to -- 364/474.16 --.

<u>Column 18,</u>
Line 11, please change "force" to -- forces --.
Line 33, after "machine" please insert -- , --.
Line 55, please change "though" to -- through --.
Line 60, please change "an" to -- a --.

Signed and Sealed this

Twenty-seventh Day of September, 2005

JON W. DUDAS
*Director of the United States Patent and Trademark Office*